(12) United States Patent
Chapman et al.

(10) Patent No.: US 9,798,987 B2
(45) Date of Patent: Oct. 24, 2017

(54) SYSTEMS AND METHODS FOR ANALYZING RESTAURANT OPERATIONS

(71) Applicant: Panera, LLC, St. Louis, MO (US)

(72) Inventors: Charles Jarvis Chapman, Needham, MA (US); Michael R. Nettles, Wildwood, MO (US)

(73) Assignee: Panera, LLC, St. Louis, MO (US)

( * ) Notice: Subject to any disclaimer, the term of this patent is extended or adjusted under 35 U.S.C. 154(b) by 0 days.

(21) Appl. No.: 15/194,959

(22) Filed: Jun. 28, 2016

(65) Prior Publication Data

US 2016/0364676 A1    Dec. 15, 2016

Related U.S. Application Data

(63) Continuation-in-part of application No. 15/059,333, filed on Mar. 3, 2016, which is a continuation of
(Continued)

(51) Int. Cl.
*G06Q 10/06* (2012.01)
*G06Q 50/12* (2012.01)
(Continued)

(52) U.S. Cl.
CPC .. *G06Q 10/063114* (2013.01); *G06K 9/00711* (2013.01); *G06Q 10/0635* (2013.01);
(Continued)

(58) Field of Classification Search
None
See application file for complete search history.

(56) References Cited

U.S. PATENT DOCUMENTS

| | | |
|---|---|---|
| 3,327,198 A | 6/1967 | Rauch |
| 4,530,067 A | 7/1985 | Dorr |
| | (Continued) | |

FOREIGN PATENT DOCUMENTS

WO    WO 01/59736 A2    8/2001

OTHER PUBLICATIONS

U.S. Appl. No. 15/059,333, filed Mar. 3, 2016, Hurst et al.
(Continued)

*Primary Examiner* — Talha M Nawaz
(74) *Attorney, Agent, or Firm* — Wolf, Greenfield & Sacks, P.C.

(57) ABSTRACT

Some embodiments of the invention provide systems and methods for analyzing the deployment of employees in a restaurant. For example, some embodiments are directed to determining whether an employee who has vacated his/her assigned station has acted appropriately in doing so, and if not, causing the employee to be redirected to his/her assigned station. Determining whether an employee acted appropriately in leaving his/her assigned station may involve analyzing video recordings of the restaurant at o around the time the employee left his/her station, operational data describing events occurring in the restaurant at or around the time the employee left his/her station, and/or other information, which may supply valuable context in determining whether or not the employee acted properly. If the employee acted improperly, he/she may be redirected to his/her assigned station, using automated, semi-automated and/or manual techniques.

25 Claims, 5 Drawing Sheets

Related U.S. Application Data application No. 14/980,109, filed on Dec. 28, 2015, now Pat. No. 9,336,830, which is a continuation of application No. 14/032,701, filed on Sep. 20, 2013, now Pat. No. 9,257,150.

(51) Int. Cl.
  *G06K 9/00* (2006.01)
  *G06Q 30/02* (2012.01)
  *G11B 27/28* (2006.01)
  *G11B 27/34* (2006.01)

(52) U.S. Cl.
  CPC ......... *G06Q 30/0201* (2013.01); *G06Q 50/12* (2013.01); *G11B 27/28* (2013.01); *G11B 27/34* (2013.01); *G06K 2009/00738* (2013.01)

(56) References Cited

U.S. PATENT DOCUMENTS

| | | |
|---|---|---|
| 4,639,367 A | 1/1987 | Mackles |
| 4,675,515 A | 6/1987 | Lucero |
| 4,752,465 A | 6/1988 | Mackles |
| 4,889,709 A | 12/1989 | Mackles et al. |
| 4,969,560 A | 11/1990 | Stanfield |
| 5,029,520 A | 7/1991 | Okada |
| 5,068,121 A | 11/1991 | Hansen et al. |
| 5,094,864 A | 3/1992 | Pinon et al. |
| 5,097,759 A | 3/1992 | Vilgrain et al. |
| 5,123,337 A | 6/1992 | Vilgrain et al. |
| 5,312,561 A | 5/1994 | Hoshino et al. |
| 5,332,105 A | 7/1994 | Stanfield |
| 5,353,219 A | 10/1994 | Mueller et al. |
| 5,356,643 A | 10/1994 | Miller et al. |
| 5,357,426 A | 10/1994 | Morita et al. |
| 5,454,721 A | 10/1995 | Kuch |
| 5,685,435 A | 11/1997 | Picioccio et al. |
| 5,704,350 A | 1/1998 | Williams, III |
| 5,796,640 A | 8/1998 | Sugarman et al. |
| 5,876,995 A | 3/1999 | Bryan |
| 5,907,275 A | 5/1999 | Battistini et al. |
| 5,940,803 A | 8/1999 | Kanemitsu |
| 6,003,015 A | 12/1999 | Kang et al. |
| 6,087,927 A | 7/2000 | Battistini et al. |
| 6,102,162 A | 8/2000 | Teicher |
| 6,113,886 A | 9/2000 | Bryan |
| 6,152,358 A | 11/2000 | Bryan |
| 6,232,107 B1 | 5/2001 | Bryan et al. |
| 6,247,995 B1 | 6/2001 | Bryan |
| 6,415,224 B1 | 7/2002 | Wako et al. |
| 6,436,682 B1 | 8/2002 | Bryan et al. |
| 6,458,080 B1 | 10/2002 | Brown et al. |
| 6,527,712 B1 | 3/2003 | Brown et al. |
| 6,577,969 B2 | 6/2003 | Takeda et al. |
| 6,587,835 B1 | 7/2003 | Treyz et al. |
| 6,618,062 B1 | 9/2003 | Brown et al. |
| 6,636,835 B2 | 10/2003 | Ragsdale-Elliott et al. |
| 6,690,673 B1 | 2/2004 | Jarvis |
| 6,753,830 B2 | 6/2004 | Gelbman |
| 6,761,332 B1 | 7/2004 | Bengtsson |
| 6,787,108 B2 | 9/2004 | Ribi |
| 6,811,516 B1 | 11/2004 | Dugan |
| 6,924,781 B1 | 8/2005 | Gelbman |
| 6,940,394 B2 | 9/2005 | Gagnon |
| 6,987,452 B2 | 1/2006 | Yang |
| 7,024,369 B1 | 4/2006 | Brown et al. |
| 7,108,171 B1 | 9/2006 | Ergo et al. |
| 7,109,315 B2 | 9/2006 | Bryan et al. |
| 7,123,956 B2 | 10/2006 | Oguma |
| 7,132,926 B2 | 11/2006 | Vaseloff et al. |
| 7,321,866 B2 | 1/2008 | Kuwana et al. |
| 7,372,003 B2 | 5/2008 | Kates |
| 7,514,262 B2 | 4/2009 | Ribi |
| 7,536,283 B2 | 5/2009 | Potter et al. |
| 7,540,011 B2 | 5/2009 | Wixson et al. |
| 7,571,139 B1 | 8/2009 | Giordano et al. |
| 7,597,844 B2 | 10/2009 | Ribi |
| 7,617,129 B2 | 11/2009 | Momose |
| 7,658,329 B2 | 2/2010 | Gelbman |
| 7,669,768 B2 | 3/2010 | Gelbman |
| 7,673,464 B2 | 3/2010 | Bodin et al. |
| 7,673,800 B2 | 3/2010 | Gelbman |
| 7,677,454 B2 | 3/2010 | Gelbman |
| 7,703,678 B2 | 4/2010 | Gelbman |
| 7,706,915 B2 | 4/2010 | Mohapatra et al. |
| 7,735,735 B2 | 6/2010 | Gelbman |
| 7,735,736 B2 | 6/2010 | Gelbman |
| 7,743,987 B2 | 6/2010 | Gelbman |
| 7,748,626 B2 | 7/2010 | Gelbman |
| 7,748,627 B2 | 7/2010 | Gelbman |
| 7,753,276 B2 | 7/2010 | Gelbman |
| 7,753,277 B2 | 7/2010 | Gelbman |
| 7,753,772 B1 | 7/2010 | Walker et al. |
| 7,757,954 B2 | 7/2010 | Gelbman |
| 7,762,461 B2 | 7/2010 | Gelbman |
| 7,762,462 B2 | 7/2010 | Gelbman |
| 7,766,238 B2 | 8/2010 | Gelbman |
| 7,784,701 B2 | 8/2010 | Gelbman |
| 7,798,404 B2 | 9/2010 | Gelbman |
| 7,815,116 B2 | 10/2010 | Gelbman |
| 7,822,591 B2 | 10/2010 | Otsuki et al. |
| 7,843,490 B2 | 11/2010 | Wixson et al. |
| 7,871,001 B2 | 1/2011 | Gelbman |
| 7,882,591 B2 | 2/2011 | Arnold |
| 7,891,569 B2 | 2/2011 | Gelbman |
| 7,899,709 B2 | 3/2011 | Allard et al. |
| 7,908,778 B1 | 3/2011 | Dushane |
| 7,913,908 B2 | 3/2011 | Gelbman |
| 7,918,395 B2 | 4/2011 | Gelbman |
| 7,918,396 B2 | 4/2011 | Gelbman |
| 7,946,489 B2 | 5/2011 | Gelbman |
| 7,953,873 B1 | 5/2011 | Madurzak |
| 7,958,457 B1 | 6/2011 | Brandenberg et al. |
| 7,973,642 B2 | 7/2011 | Schackmuth et al. |
| 7,976,386 B2 | 7/2011 | Tran |
| 8,054,218 B2 | 11/2011 | Gelbman |
| 8,078,492 B2 | 12/2011 | Brown et al. |
| 8,101,892 B2 | 1/2012 | Kates |
| 8,108,406 B2 | 1/2012 | Kenedy et al. |
| 8,181,821 B2 | 5/2012 | Freedman |
| 8,204,757 B2 | 6/2012 | Carlson et al. |
| 8,234,128 B2 | 7/2012 | Martucci et al. |
| 8,234,160 B2 | 7/2012 | Brown et al. |
| 8,291,484 B2 | 10/2012 | Hagens et al. |
| 8,453,228 B2 | 5/2013 | Hagens et al. |
| 8,453,288 B2 | 6/2013 | Driesen et al. |
| 8,549,571 B2 | 10/2013 | Loher et al. |
| 9,257,150 B2 | 2/2016 | Hurst et al. |
| 9,336,830 B1 | 5/2016 | Hurst et al. |
| 2001/0020935 A1 | 9/2001 | Gelbman |
| 2001/0025279 A1 | 9/2001 | Krulak et al. |
| 2001/0054008 A1 | 12/2001 | Miller et al. |
| 2001/0054009 A1 | 12/2001 | Miller et al. |
| 2001/0054067 A1 | 12/2001 | Miller et al. |
| 2002/0002496 A1 | 1/2002 | Miller et al. |
| 2002/0003166 A1 | 1/2002 | Miller et al. |
| 2002/0004749 A1 | 1/2002 | Froseth et al. |
| 2002/0004942 A1 | 1/2002 | Bryan |
| 2002/0007307 A1 | 1/2002 | Miller et al. |
| 2002/0022963 A1 | 2/2002 | Miller et al. |
| 2002/0022992 A1 | 2/2002 | Miller et al. |
| 2002/0022993 A1 | 2/2002 | Miller et al. |
| 2002/0022994 A1 | 2/2002 | Miller et al. |
| 2002/0022995 A1 | 2/2002 | Miller et al. |
| 2002/0023959 A1 | 2/2002 | Miller et al. |
| 2002/0026357 A1 | 2/2002 | Miller et al. |
| 2002/0026358 A1 | 2/2002 | Miller et al. |
| 2002/0026369 A1 | 2/2002 | Miller et al. |
| 2002/0027164 A1 | 3/2002 | Mault et al. |
| 2002/0029181 A1 | 3/2002 | Miller et al. |
| 2002/0030105 A1 | 3/2002 | Miller et al. |
| 2002/0035439 A1 | 3/2002 | Takeda et al. |
| 2002/0046093 A1 | 4/2002 | Miller et al. |
| 2002/0049598 A1 | 4/2002 | Negreiro |

(56) References Cited

U.S. PATENT DOCUMENTS

| | | |
|---|---|---|
| 2002/0052790 A1 | 5/2002 | Tomishima |
| 2002/0055878 A1 | 5/2002 | Burton et al. |
| 2002/0065717 A1 | 5/2002 | Miller et al. |
| 2002/0082924 A1 | 6/2002 | Koether |
| 2002/0095402 A1 | 7/2002 | Dillard et al. |
| 2002/0133418 A1 | 9/2002 | Hammond et al. |
| 2002/0138350 A1 | 9/2002 | Cogen |
| 2002/0147647 A1 | 10/2002 | Ragsdale-Elliott et al. |
| 2002/0152123 A1 | 10/2002 | Giordano et al. |
| 2002/0158137 A1 | 10/2002 | Grey et al. |
| 2002/0167500 A1 | 11/2002 | Gelbman |
| 2002/0174015 A1 | 11/2002 | Kuwana et al. |
| 2003/0007663 A1 | 1/2003 | Wixson et al. |
| 2003/0046166 A1 | 3/2003 | Liebman |
| 2003/0065561 A1 | 4/2003 | Brown et al. |
| 2003/0066096 A1 | 4/2003 | Bryan |
| 2003/0088471 A1 | 5/2003 | Tanigaki et al. |
| 2003/0092098 A1 | 5/2003 | Bryan et al. |
| 2003/0120506 A1 | 6/2003 | Komiya et al. |
| 2003/0158763 A1 | 8/2003 | McKee |
| 2003/0171944 A1 | 9/2003 | Fine et al. |
| 2003/0185706 A1 | 10/2003 | Ribi |
| 2003/0208396 A1 | 11/2003 | Miller et al. |
| 2003/0208409 A1 | 11/2003 | Mault |
| 2004/0010425 A1 | 1/2004 | Wilkes et al. |
| 2004/0034568 A1 | 2/2004 | Sone |
| 2004/0054592 A1 | 3/2004 | Hernblad |
| 2004/0078231 A1 | 4/2004 | Wilkes et al. |
| 2004/0107141 A1 | 6/2004 | Conkel et al. |
| 2004/0133483 A1 | 7/2004 | Potter et al. |
| 2004/0143512 A1 | 7/2004 | Sturr, Jr. |
| 2004/0158499 A1 | 8/2004 | Dev et al. |
| 2004/0167465 A1 | 8/2004 | Mihai et al. |
| 2004/0167804 A1 | 8/2004 | Simpson et al. |
| 2004/0172222 A1 | 9/2004 | Simpson et al. |
| 2004/0172300 A1 | 9/2004 | Mihai et al. |
| 2004/0172301 A1 | 9/2004 | Mihai et al. |
| 2004/0172302 A1 | 9/2004 | Martucci et al. |
| 2004/0176667 A1 | 9/2004 | Mihai et al. |
| 2004/0186783 A1 | 9/2004 | Knight et al. |
| 2004/0187146 A1 | 9/2004 | Iga |
| 2004/0199425 A1 | 10/2004 | Van Luchene et al. |
| 2004/0210621 A1 | 10/2004 | Antonellis |
| 2004/0230496 A1 | 11/2004 | Neuman et al. |
| 2004/0243471 A1 | 12/2004 | Salmen et al. |
| 2004/0243472 A1 | 12/2004 | Vadjinia |
| 2004/0249497 A1 | 12/2004 | Saigh et al. |
| 2004/0249724 A1 | 12/2004 | Gosewehr |
| 2004/0257918 A1 | 12/2004 | Ribi |
| 2004/0260607 A1 | 12/2004 | Robbins et al. |
| 2005/0004843 A1 | 1/2005 | Heflin |
| 2005/0010808 A1 | 1/2005 | Wixson et al. |
| 2005/0012818 A1 | 1/2005 | Kiely et al. |
| 2005/0027174 A1 | 2/2005 | Benardot |
| 2005/0037498 A1 | 2/2005 | Ribi |
| 2005/0046547 A1 | 3/2005 | Gagnon |
| 2005/0055242 A1 | 3/2005 | Bello et al. |
| 2005/0055244 A1 | 3/2005 | Mullan et al. |
| 2005/0065817 A1 | 3/2005 | Mihai et al. |
| 2005/0080650 A1 | 4/2005 | Noel |
| 2005/0104730 A1 | 5/2005 | Yang |
| 2005/0114150 A1 | 5/2005 | Franklin |
| 2005/0144066 A1 | 6/2005 | Cope et al. |
| 2005/0160005 A1 | 7/2005 | Roth et al. |
| 2005/0171902 A1 | 8/2005 | Nguyen |
| 2005/0177859 A1 | 8/2005 | Valentino et al. |
| 2005/0193901 A1 | 9/2005 | Buehler |
| 2005/0209963 A1 | 9/2005 | Momose |
| 2005/0211775 A1 | 9/2005 | Vaseloff et al. |
| 2005/0266491 A1 | 12/2005 | Bryan et al. |
| 2005/0267811 A1 | 12/2005 | Almblad |
| 2005/0272111 A1 | 12/2005 | Bryan et al. |
| 2005/0278065 A1 | 12/2005 | Garza |
| 2006/0015904 A1 | 1/2006 | Marcus |
| 2006/0053505 A1 | 3/2006 | Bryan |
| 2006/0064447 A1 | 3/2006 | Malkov |
| 2006/0069461 A1 | 3/2006 | Kaneko et al. |
| 2006/0149416 A1 | 7/2006 | Mohapatra et al. |
| 2006/0149642 A1 | 7/2006 | Dillard et al. |
| 2006/0169787 A1 | 8/2006 | Gelbman |
| 2006/0173754 A1 | 8/2006 | Burton et al. |
| 2006/0178986 A1 | 8/2006 | Giordano et al. |
| 2006/0186197 A1 | 8/2006 | Rosenberg |
| 2006/0213904 A1 | 9/2006 | Kates |
| 2006/0218039 A1 | 9/2006 | Johnson |
| 2006/0293965 A1 | 12/2006 | Burton |
| 2007/0005434 A1 | 1/2007 | Roth et al. |
| 2007/0024551 A1 | 2/2007 | Gelbman |
| 2007/0088624 A1 | 4/2007 | Vaughn et al. |
| 2007/0132844 A1 | 6/2007 | Katz |
| 2007/0150375 A1 | 6/2007 | Yang |
| 2007/0152810 A1 | 7/2007 | Livingston |
| 2007/0158335 A1 | 7/2007 | Mansbery |
| 2007/0158410 A1* | 7/2007 | Bustamante ............ G07C 1/10 235/380 |
| 2007/0168223 A1 | 7/2007 | Fors et al. |
| 2007/0190501 A1 | 8/2007 | Brown et al. |
| 2007/0198432 A1 | 8/2007 | Pitroda et al. |
| 2007/0243934 A1 | 10/2007 | Little et al. |
| 2007/0264395 A1 | 11/2007 | Adams et al. |
| 2007/0265935 A1 | 11/2007 | Woycik et al. |
| 2007/0298885 A1 | 12/2007 | Tran |
| 2008/0026816 A1 | 1/2008 | Sammon et al. |
| 2008/0033827 A1 | 2/2008 | Kuang et al. |
| 2008/0033935 A1 | 2/2008 | Frank |
| 2008/0033936 A1 | 2/2008 | Frank |
| 2008/0033944 A1 | 2/2008 | Frank |
| 2008/0034001 A1 | 2/2008 | Noel |
| 2008/0040336 A1 | 2/2008 | Frank |
| 2008/0047282 A1 | 2/2008 | Bodin et al. |
| 2008/0047781 A1 | 2/2008 | Feiertag |
| 2008/0065505 A1 | 3/2008 | Plastina et al. |
| 2008/0065685 A1 | 3/2008 | Frank |
| 2008/0107304 A1 | 5/2008 | Coulter |
| 2008/0157961 A1 | 7/2008 | Park et al. |
| 2008/0189172 A1 | 8/2008 | Goren et al. |
| 2008/0199155 A1 | 8/2008 | Hagens et al. |
| 2008/0204246 A1 | 8/2008 | Kates |
| 2008/0208787 A1 | 8/2008 | Luchene |
| 2008/0228600 A1 | 9/2008 | Treyz et al. |
| 2008/0255930 A1 | 10/2008 | Cope et al. |
| 2008/0255941 A1 | 10/2008 | Otto et al. |
| 2008/0270324 A1 | 10/2008 | Allard et al. |
| 2008/0276199 A1 | 11/2008 | Hosogai et al. |
| 2008/0295207 A1 | 11/2008 | Baum et al. |
| 2008/0297442 A1 | 12/2008 | Gelbman |
| 2008/0297454 A1 | 12/2008 | Gelbman |
| 2008/0309551 A1 | 12/2008 | Gelbman |
| 2008/0313052 A1 | 12/2008 | Otto et al. |
| 2008/0314991 A1 | 12/2008 | Gelbman |
| 2008/0314992 A1 | 12/2008 | Gelbman |
| 2008/0318679 A1 | 12/2008 | Tran et al. |
| 2009/0014512 A1 | 1/2009 | Gelbman |
| 2009/0014517 A1 | 1/2009 | Gelbman |
| 2009/0014528 A1 | 1/2009 | Gelbman |
| 2009/0014529 A1 | 1/2009 | Gelbman |
| 2009/0014530 A1 | 1/2009 | Gelbman |
| 2009/0014531 A1 | 1/2009 | Gelbman |
| 2009/0014532 A1 | 1/2009 | Gelbman |
| 2009/0014533 A1 | 1/2009 | Gelbman |
| 2009/0014534 A1 | 1/2009 | Gelbman |
| 2009/0014535 A1 | 1/2009 | Gelbman |
| 2009/0014536 A1 | 1/2009 | Gelbman |
| 2009/0014537 A1 | 1/2009 | Gelbman |
| 2009/0014538 A1 | 1/2009 | Gelbman |
| 2009/0014539 A1 | 1/2009 | Gelbman |
| 2009/0014540 A1 | 1/2009 | Gelbman |
| 2009/0014541 A1 | 1/2009 | Gelbman |
| 2009/0014542 A1 | 1/2009 | Gelbman |
| 2009/0015427 A1 | 1/2009 | Gelbman |
| 2009/0020605 A1 | 1/2009 | Gelbman |
| 2009/0020614 A1 | 1/2009 | Gelbman |
| 2009/0026273 A1 | 1/2009 | Gelbman |
| 2009/0026274 A1 | 1/2009 | Gelbman |

(56) References Cited

U.S. PATENT DOCUMENTS

| | | |
|---|---|---|
| 2009/0039169 A1 | 2/2009 | Gelbman |
| 2009/0048878 A1 | 2/2009 | Metcalf |
| 2009/0051545 A1* | 2/2009 | Koblasz ............... G08B 21/245 |
| | | 340/573.1 |
| 2009/0064445 A1 | 3/2009 | Arnold |
| 2009/0106124 A1 | 4/2009 | Yang |
| 2009/0119168 A1 | 5/2009 | Otto et al. |
| 2009/0125380 A1 | 5/2009 | Otto et al. |
| 2009/0150193 A1 | 6/2009 | Hong et al. |
| 2009/0167553 A1 | 7/2009 | Hong et al. |
| 2009/0172035 A1 | 7/2009 | Lessing et al. |
| 2009/0192901 A1 | 7/2009 | Egeresi |
| 2009/0196958 A1 | 8/2009 | Sosebee |
| 2009/0222730 A1 | 9/2009 | Wixson et al. |
| 2009/0228336 A1 | 9/2009 | Giordano |
| 2009/0228836 A1 | 9/2009 | Silva |
| 2009/0241481 A1 | 10/2009 | Sus et al. |
| 2009/0275002 A1 | 11/2009 | Hoggle |
| 2009/0281903 A1 | 11/2009 | Blatstein |
| 2009/0307096 A1 | 12/2009 | Antonellis |
| 2010/0005489 A1 | 1/2010 | Losey |
| 2010/0012676 A1 | 1/2010 | Freedman |
| 2010/0024361 A1 | 2/2010 | Ebeling |
| 2010/0030661 A1 | 2/2010 | Friedland et al. |
| 2010/0064394 A1 | 3/2010 | Baum et al. |
| 2010/0076854 A1 | 3/2010 | Martucci et al. |
| 2010/0082444 A1 | 4/2010 | Lin et al. |
| 2010/0082485 A1 | 4/2010 | Lin et al. |
| 2010/0114595 A1 | 5/2010 | Richard |
| 2010/0129502 A1 | 5/2010 | Feinberg et al. |
| 2010/0136179 A1 | 6/2010 | Mochizuki et al. |
| 2010/0161446 A1 | 6/2010 | Alfred et al. |
| 2010/0169262 A1 | 7/2010 | Kenedy et al. |
| 2010/0169313 A1 | 7/2010 | Kenedy et al. |
| 2010/0169338 A1 | 7/2010 | Kenedy et al. |
| 2010/0169340 A1 | 7/2010 | Kenedy et al. |
| 2010/0169342 A1 | 7/2010 | Kenedy et al. |
| 2010/0169343 A1 | 7/2010 | Kenedy et al. |
| 2010/0241707 A1 | 9/2010 | Burton et al. |
| 2010/0280895 A1 | 11/2010 | Mottola |
| 2010/0312385 A1 | 12/2010 | Deuber |
| 2010/0324962 A1 | 12/2010 | Nesler et al. |
| 2010/0332571 A1 | 12/2010 | Healey et al. |
| 2011/0010623 A1 | 1/2011 | Vanslette et al. |
| 2011/0031236 A1 | 2/2011 | Ben-Shmuel et al. |
| 2011/0063108 A1* | 3/2011 | Aonuma ............ G06Q 20/4016 |
| | | 340/540 |
| 2011/0063500 A1 | 3/2011 | Loher et al. |
| 2011/0070566 A1 | 3/2011 | Hanulak et al. |
| 2011/0093363 A1 | 4/2011 | Blatstein |
| 2011/0106698 A1 | 5/2011 | Isaacson et al. |
| 2011/0136516 A1 | 6/2011 | Ellis |
| 2011/0160550 A1 | 6/2011 | Hwang et al. |
| 2011/0187664 A1 | 8/2011 | Rinehart |
| 2011/0218839 A1 | 9/2011 | Shamaiengar |
| 2011/0225032 A1 | 9/2011 | Kobres |
| 2011/0253482 A1 | 10/2011 | Purgatorio et al. |
| 2011/0258011 A1 | 10/2011 | Burns et al. |
| 2011/0261049 A1 | 10/2011 | Cardno et al. |
| 2011/0282726 A1 | 11/2011 | Brown et al. |
| 2011/0321127 A1 | 12/2011 | Pitroda et al. |
| 2012/0005077 A1 | 1/2012 | Pitroda et al. |
| 2012/0005078 A1 | 1/2012 | Pitroda et al. |
| 2012/0005079 A1 | 1/2012 | Pitroda et al. |
| 2012/0005080 A1 | 1/2012 | Pitroda et al. |
| 2012/0005081 A1 | 1/2012 | Pitroda et al. |
| 2012/0005082 A1 | 1/2012 | Pitroda et al. |
| 2012/0005083 A1 | 1/2012 | Pitroda et al. |
| 2012/0005084 A1 | 1/2012 | Pitroda et al. |
| 2012/0005085 A1 | 1/2012 | Pitroda et al. |
| 2012/0005086 A1 | 1/2012 | Pitroda et al. |
| 2012/0005087 A1 | 1/2012 | Pitroda et al. |
| 2012/0005088 A1 | 1/2012 | Pitroda et al. |
| 2012/0005089 A1 | 1/2012 | Pitroda et al. |
| 2012/0005090 A1 | 1/2012 | Pitroda et al. |
| 2012/0005091 A1 | 1/2012 | Pitroda et al. |
| 2012/0005092 A1 | 1/2012 | Pitroda et al. |
| 2012/0005725 A1 | 1/2012 | Pitroda et al. |
| 2012/0005726 A1 | 1/2012 | Pitroda et al. |
| 2012/0011058 A1 | 1/2012 | Pitroda et al. |
| 2012/0029928 A1 | 2/2012 | Kountotsis |
| 2012/0066144 A1* | 3/2012 | Berkvens ............... G06Q 10/00 |
| | | 705/345 |
| 2012/0069131 A1 | 3/2012 | Abelow |
| 2012/0075168 A1 | 3/2012 | Osterhout et al. |
| 2012/0078734 A1 | 3/2012 | Sus et al. |
| 2012/0084135 A1 | 4/2012 | Nissan et al. |
| 2012/0096403 A1 | 4/2012 | Jung et al. |
| 2012/0098970 A1 | 4/2012 | Amini et al. |
| 2012/0101831 A1 | 4/2012 | Pitroda et al. |
| 2012/0101832 A1 | 4/2012 | Pitroda et al. |
| 2012/0101833 A1 | 4/2012 | Pitroda et al. |
| 2012/0101834 A1 | 4/2012 | Pitroda et al. |
| 2012/0101835 A1 | 4/2012 | Pitroda et al. |
| 2012/0101836 A1 | 4/2012 | Pitroda et al. |
| 2012/0109667 A1 | 5/2012 | Pitroda et al. |
| 2012/0109668 A1 | 5/2012 | Pitroda et al. |
| 2012/0109669 A1 | 5/2012 | Pitroda et al. |
| 2012/0109670 A1 | 5/2012 | Pitroda et al. |
| 2012/0109671 A1 | 5/2012 | Pitroda et al. |
| 2012/0109672 A1 | 5/2012 | Pitroda et al. |
| 2012/0109673 A1 | 5/2012 | Pitroda et al. |
| 2012/0109674 A1 | 5/2012 | Pitroda et al. |
| 2012/0116790 A1 | 5/2012 | Pitroda et al. |
| 2012/0116959 A1 | 5/2012 | Pitroda et al. |
| 2012/0129517 A1 | 5/2012 | Fox et al. |
| 2012/0131034 A1 | 5/2012 | Kenedy et al. |
| 2012/0150599 A1 | 6/2012 | Isaacson et al. |
| 2012/0150600 A1 | 6/2012 | Isaacson et al. |
| 2012/0150605 A1 | 6/2012 | Isaacson et al. |
| 2012/0150610 A1 | 6/2012 | Isaacson et al. |
| 2012/0150615 A1 | 6/2012 | Isaacson et al. |
| 2012/0150643 A1 | 6/2012 | Wolfe et al. |
| 2012/0150728 A1 | 6/2012 | Isaacson et al. |
| 2012/0150729 A1 | 6/2012 | Isaacson et al. |
| 2012/0150730 A1 | 6/2012 | Isaacson et al. |
| 2012/0150731 A1 | 6/2012 | Isaacson et al. |
| 2012/0150732 A1 | 6/2012 | Isaacson et al. |
| 2012/0150743 A1 | 6/2012 | Isaacson et al. |
| 2012/0156337 A1 | 6/2012 | Studor et al. |
| 2012/0156339 A1 | 6/2012 | Studor et al. |
| 2012/0156343 A1 | 6/2012 | Studor et al. |
| 2012/0156344 A1 | 6/2012 | Studor et al. |
| 2012/0158203 A1* | 6/2012 | Feldstein ............... G06F 1/3231 |
| | | 700/295 |
| 2012/0166267 A1 | 6/2012 | Beatty et al. |
| 2012/0173336 A1 | 7/2012 | Strumolo |
| 2012/0183932 A1 | 7/2012 | Chang et al. |
| 2012/0185305 A1 | 7/2012 | Brown et al. |
| 2012/0190386 A1 | 7/2012 | Anderson |
| 2012/0194418 A1 | 8/2012 | Osterhout et al. |
| 2012/0194419 A1 | 8/2012 | Osterhout et al. |
| 2012/0194420 A1 | 8/2012 | Osterhout et al. |
| 2012/0194549 A1 | 8/2012 | Osterhout et al. |
| 2012/0194550 A1 | 8/2012 | Osterhout et al. |
| 2012/0194551 A1 | 8/2012 | Osterhout et al. |
| 2012/0194552 A1 | 8/2012 | Osterhout et al. |
| 2012/0194553 A1 | 8/2012 | Osterhout et al. |
| 2012/0200488 A1 | 8/2012 | Osterhout et al. |
| 2012/0200499 A1 | 8/2012 | Osterhout et al. |
| 2012/0200601 A1 | 8/2012 | Osterhout et al. |
| 2012/0331499 A1 | 12/2012 | Hagens et al. |
| 2013/0027561 A1 | 1/2013 | Lee et al. |
| 2013/0166334 A1 | 6/2013 | Liberty |
| 2013/0198345 A1 | 8/2013 | Hagens et al. |
| 2013/0282624 A1 | 10/2013 | Schackmuth et al. |
| 2013/0290154 A1* | 10/2013 | Cherry ............... G06Q 40/00 |
| | | 705/32 |
| 2014/0122186 A1 | 5/2014 | Hurst et al. |
| 2014/0316915 A1 | 10/2014 | Hickey |
| 2015/0086179 A1 | 3/2015 | Hurst et al. |
| 2015/0088594 A1 | 3/2015 | Hurst et al. |
| 2015/0194043 A1* | 7/2015 | Dunn ............... G06K 9/00335 |
| | | 340/573.1 |

(56) References Cited

U.S. PATENT DOCUMENTS

2016/0111132 A1 4/2016 Hurst et al.
2016/0180477 A1 6/2016 Hurst et al.
2016/0364661 A1 12/2016 Hurst et al.

OTHER PUBLICATIONS

U.S. Appl. No. 15/194,949, filed Jun. 28, 2016, Hurst et al.
PCT/US2013/067388, dated May 2, 2014, International Search Report and Written Opinion.
PCT/US2013/067388, dated Oct. 10, 2014, International Search Report and Report on Patentability.
PCT/US2014/053100, dated Nov. 24, 2014, International Search Report and Written Opinion.
PCT/US2014/053100, dated Sep. 23, 2015, Written Opinion of the International Preliminary Examining Authority.
PCT/US2014/053100, dated Jan. 4, 2016, International Preliminary Report on Patentability.
PCT/US2014/053132, dated Dec. 17, 2014, International Search Report and Written Opinion.
PCT/US2014/053132, dated Sep. 11, 2015, International Preliminary Report on Patentability.
International Search Report and Written Opinion for Application No. PCT/US2013/067388 dated May 2, 2014.
International Preliminary Report on Patentability for Application No. PCT/US2013/067388 dated Oct. 10, 2014.
International Search Report and Written Opinion for Application No. PCT/US2014/053100 dated Nov. 24, 2014.
Written Opinion of the International Preliminary Examining Authority for Application No. PCT/US2014/053100 dated Sep. 23, 2015.
International Preliminary Report on Patentability for Application No. PCT/US2014/053100 dated Jan. 4, 2016.
International Search Report and Written Opinion for Application No. PCT/US2014/053132 dated Dec. 17, 2014.
International Preliminary Report on Patentability for Application No. PCT/US2014/053132 dated Sep. 11, 2015.
Aron, Augmented reality kitchens keep novice chefs on track. Technology News. Aug. 2012. https://www.newscientist.com/article/mg21528774-900-augmented-reality-kitchens-keep-novice-chefs-on-track.
Liddle, Eat 'n. Park breaks down video surveillance strategy. Nov. 26, 2012: 1-3 http://nrn.com/latest-headlines/eat-n-park-breaks-down-video-surveillance-strategy.

* cited by examiner

SYSTEMS AND METHODS FOR ANALYZING RESTAURANT OPERATIONS

RELATED APPLICATIONS

This application is a continuation-in-part of commonly assigned, co-pending U.S. patent application Ser. No. 15/059,333, filed Mar. 3, 2016, entitled TECHNIQUES FOR ANALYZING OPERATIONS OF ONE OR MORE RESTAURANTS, which is a continuation of commonly assigned U.S. patent application Ser. No. 14/980,109, filed Dec. 28, 2015, entitled TECHNIQUES FOR ANALYZING OPERATIONS OF ONE OR MORE RESTAURANTS, now U.S. Pat. No. 9,336,830, which is a continuation of commonly assigned U.S. patent application Ser. No. 14/032,701, filed Sep. 20, 2013, entitled TECHNIQUES FOR ANALYZING OPERATIONS OF ONE OR MORE RESTAURANTS, now U.S. Pat. No. 9,257,150. The entirety of each of the documents listed above is incorporated herein by reference.

BACKGROUND

Many restaurants, retail establishments, and other commercial enterprises establish labor budgets as a percentage of revenue. For example, a restaurant may establish a labor budget for a particular day as 25% of its expected sales that day, so that if the restaurant is expected to earn $10,000 in sales, its labor budget for that day is $2,500. The way that this labor budget is "spent" may, for example, be influenced by characteristics of the restaurant. For example, a restaurant with a drive-through window may dedicate an employee to assisting drive-up customers throughout the day, while a restaurant without a drive-through window may not. Other roles for restaurant employees may include, but are not limited to, cashier roles, food preparation ("production line") roles, "expediter" roles (e.g., responsible for completing final assembly of customer orders, checking that orders are accurately fulfilled, ensuring that food preparation staff prepared orders in accordance with customer specifications, etc.) and cleaner roles.

Often, commercial enterprises that establish a labor budget based on expected sales employ a static, predefined employee deployment model, meaning that employees are assigned particular roles throughout their shifts. One problem with static employee deployment models is that they may not appropriately satisfy changing demand for various functions performed by employees throughout a typical day. For example, many restaurants experience busy periods during common meal times, and so the need for employees in specific roles, and the number of employees needed overall, may be different during busy periods and slow periods. As such, some commercial enterprises employ peak period employee deployment models and slow period employee deployment models to manage staffing levels and workforce composition over the course of a day.

Employee deployment models may define when additional staff are called into work, such as if actual sales exceed expected sales by a threshold amount. For example, an employee deployment model for a restaurant may provide for, if it appears during the course of a given day that the restaurant will exceed its $10,000 expected sales by ten percent, calling certain employees into work to satisfy customer demand, and assigning those employees to certain roles if they are called. Some employee deployment models employ theoretical "floors" and/or "ceilings" which specify a minimum and maximum number of employees, respectively, to be working at any one time regardless of sales amount.

Some restaurants use employee certification procedures or the like to assess and identify the employees which are best suited to particular roles. As a result, if an employee deployment model for a restaurant provides for a total of ten employees working at a particular time, information on each employee's expertise and prior experience may be used to determine which employee is assigned which role. This information may be used to determine not only the roles in which employees are initially deployed, but also the roles to which employees are redeployed if the composition of the workforce or circumstances in the restaurant change.

SUMMARY

Conventionally, some commercial enterprises use quantitative data (e.g., measures of employee throughput) to evaluate employee performance. Some commercial enterprises also employ quantitative data to determine whether and how particular employees should be redeployed to different roles throughout a work day. For example, a restaurant may base a decision whether to keep an employee assigned to a cashier station or redeploy her at least in part on quantitative data like the number of orders she handled in a given time period, the average amount of time per order, etc. Even if the employee is not the most experienced or skilled cashier working in the restaurant that day, favorable quantitative data may influence a decision to keep her in that role, even if other, more experienced cashiers are reassigned to other roles. Additionally, some commercial enterprises may direct certain tasks, or more tasks, to employees based on quantitative data. For example, if there are two employees assigned to food preparation stations in a restaurant, more orders may be directed to the employee which, according to quantitative data, completes more orders in a given time period.

The Assignee has appreciated that assigning roles and/or tasks to employees based on quantitative data may not ensure that the needs of the employee's internal and external customers are entirely satisfied. Using the example of the two employees assigned to food preparation roles given above to illustrate, the first of the two employees may be faster at preparing customer orders than the second of the two employees, but may be more prone to errors, so that the net effect of her completing customer orders faster is that more orders are prepared incorrectly. Using the example of the cashier given above to illustrate further, the employee assigned to that role may be capable of taking more orders than other employees, but may be less effective than those other employees at engendering warmth with customers, accurately conveying what the customer ordered to food preparation staff, etc., so that the effect of the employee taking more orders is that a greater number of customers are left feeling dissatisfied with their experience with the restaurant.

As such, the Assignee has recognized that the conventional practice of evaluating employee performance and basing employee deployment decisions on quantitative data may in certain circumstances have a negative effect on restaurant operations and/or customer satisfaction. Accordingly, some embodiments of the invention may involve evaluating employee performance and/or basing employee deployment decisions at least in part on qualitative assessments of an employee's performance in a particular role. Such qualitative assessments may take any of numerous forms, and may be performed in any of numerous ways. In some examples, qualitative assessments may relate to evaluating the employee's success in promoting customer satisfaction. For example, an employee's performance in a cashier role may be evaluated based at least in part on the warmth with which she greets customers, whether she engages customers in something other than talk about an order, suggests side dishes or drinks to the customer, informs the customer what to do next after submitting an order, and otherwise engenders a feeling on the customer's part of satisfaction with the transaction. In other examples, qualitative assessments may be used to verify the accuracy of quantitative data which is collected to evaluate employee performance. For example, if a restaurant captures quantitative data relating to customer order progress through different preparation stages, then qualitative assessments may help to determine whether employees' indications that certain preparation steps have been completed are accurate, or whether those indications are premature, and therefore skew performance indicators.

Some embodiments of the invention provide techniques for analyzing the deployment of employees in a restaurant. In this respect, the Assignee has recognized that a number of conventional tools may enable the location of individual employees in a restaurant to be tracked over time, and allow the area defining an employee's assigned station to be defined, so that various conventional tools could be used to determine when an employee has left his/her assigned station. The Assignee has also recognized that when employees are not working in the stations to which they have been assigned, the speed at which customer orders are fulfilled and the overall throughput of the restaurant may be significantly diminished. The Assignee has further recognized, however, that in some circumstances it may be appropriate for an employee to leave his/her assigned station, for a number of reasons. As such, some embodiments of the invention are directed to determining whether an employee who has left his/her assigned station acted appropriately in doing so, and if not, causing the employee to be redirected to his/her assigned station. In some embodiments, determining whether an employee acted appropriately in leaving his/her assigned station may involve analyzing video recordings of the restaurant at or around the time the employee left his/her station, operational data describing events occurring in the restaurant at or around the time the employee left his/her station, and/or other information. In this respect, the Assignee has recognized that such video recordings, operational data and/or other information may supply valuable context in determining whether or not an employee acted improperly in leaving his/her assigned station in the restaurant. If the employee acted improperly, he/she may be redirected to his/her assigned station using automated, semi-automated and/or manual techniques.

Accordingly, some embodiments of the invention are directed to a system for use in analyzing deployment of employees in a restaurant. The system comprises: at least one employee location data source; at least one recording device configured to capture video recordings of occurrences in the restaurant; at least one computer-readable storage medium having instructions recorded thereon; and at least one processor, programmed via the instructions to: determine, based at least in part on data generated by the at least one employee location data source, that an employee vacated a station in the restaurant to which the employee is assigned during a particular time period; determine, based at least in part on a video recording depicting the restaurant during the particular time period, whether the employee improperly vacated the station to which the employee is assigned; if it is determined that the employee improperly vacated the station, causing the employee to be redirected back to the station.

The foregoing summary is a non-limiting overview of only some aspects of the invention. Some embodiments of the invention are described below and defined in the attached claims.

BRIEF DESCRIPTION OF DRAWINGS

The accompanying drawings are not intended to be drawn to scale. In the drawings, each identical or nearly identical component illustrated in the various figures is represented by a like numeral. For purposes of clarity, not every component may be labeled in every drawing. In the drawings.

DETAILED DESCRIPTION

Figure 1:
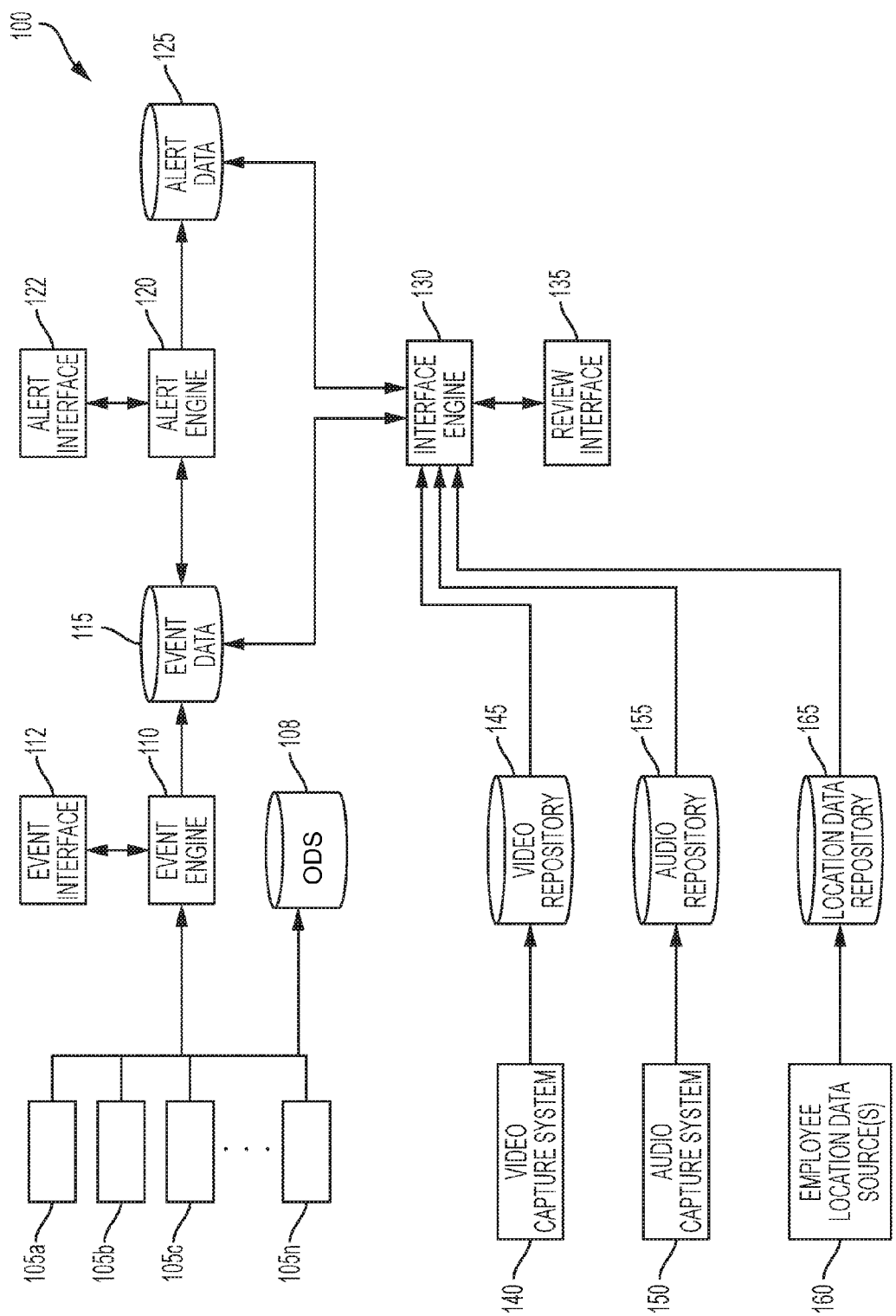
FIG. 1 is a block diagram depicting a representative system for analyzing restaurant operations, in accordance with some embodiments of the invention.

Some embodiments of the invention are directed to systems for analyzing the operations of a restaurant. In some embodiments, such systems may analyze audio and/or video recordings of occurrences in the restaurant to generate a qualitative assessment of an employee's performance in a role in the restaurant during a particular time period. Quantitative data, such as may be generated by one or more operational systems deployed in the restaurant, may provide an indication of the employee's performance in the role during the same time period. In some embodiments of the invention, an overall assessment of the employee's performance in the role during the time period may be based at least in part on the qualitative assessment and the quantitative data.

Some embodiments of the invention may be directed to managing the deployment of employees in a restaurant. For example, some embodiments may analyze audio and/or video recordings of occurrences in a restaurant to generate a qualitative assessment of the performance by each of multiple employees in a corresponding role during a time period. Quantitative data may provide an indication of the employees' performance in corresponding roles during the time period. The qualitative assessments and the quantitative data may be used, for example, to determine which of the multiple employees should be assigned to a particular role in the restaurant in a future time period.

Some embodiments are directed to analyzing the deployment of employees in a restaurant. In this respect, the Assignee has recognized that a number of conventional tools may allow the location of individual restaurant employees to be monitored over time, and that these tools allow the area defining an employee's assigned station to be defined. As such, various conventional tools could be used to determine when an employee has left his/her assigned station. The Assignee has also recognized that when employees are not working in the stations to which they have been assigned, the speed at which customer orders are fulfilled, and the overall throughput of the restaurant, may be significantly diminished. The Assignee has further recognized, however, that in some circumstances it may be appropriate for an employee to leave his/her assigned station, for a number of reasons. As such, some embodiments of the invention are directed to determining whether an employee who has left his/her assigned station acted appropriately in doing so, such as by analyzing video recordings of the restaurant at or around the time the employee left his/her station, operational data describing events occurring in the restaurant at or around the time the employee left his/her station, and/or other information. In this respect, the Assignee has recognized that such video recordings, operational data and/or other information may supply valuable context in determining whether or not an employee acted properly or improperly in leaving his/her assigned station in the restaurant. In some embodiments, if it is determined that the employee acted improperly in leaving his/her assigned station, then the employee may be redirected back to his/her assigned station, using automated, semi-automated and/or manual techniques.

It should be appreciated that, as used herein, the term "employee" means any person who performs work for another person or entity. As such, an employee, as the term is used herein, may or may not be someone who satisfies the definition of the term "employee" under federal, state and/or local law in that he/she is a person in the service of another under a contract of hire in which the employer has the power or right to control and direct the employee in the material details of how the work is to be performed. For example, an employee, as the term is used herein, may be someone whom federal, state and/or local law would term an independent contractor, an agent, and/or someone who performs work for another person or entity in any other capacity.

I. Overview of Representative System Infrastructure

FIG. 1 depicts a representative system 100 comprising various components for analyzing the operations of a restaurant. Representative system 100 includes operational systems 105a, 105b, 105c and 105n, which capture various data relating to restaurant operations and the customer's experience. Operational systems 105a-105n may include, for example, systems for monitoring and/or facilitating kitchen operations, for managing staff, for conducting point of sale transactions, and/or for facilitating any of numerous aspects of restaurant operations. Any suitable type of system, for monitoring any suitable aspect(s) of a restaurant's operations, may comprise an operational system 105. Although only four operational systems 105 are shown in FIG. 1, it should be understood that any suitable number of operational systems may be used in a system 100 which is implemented in accordance with aspects of the invention.

Operational data store (ODS) 108 receives and stores data produced by operational systems 105a-105n. ODS 108 may store any suitable information. As an example, ODS 108 may store the date and time of individual occurrences relating to a transaction (e.g., measured by transaction start, time stored at tender, time sent to line, time worked at line, time sent to expediter, time delivered to customer, and/or the time of any other suitable occurrence relating to a transaction), item information associated with a transaction (e.g., including item codes for items included in each transaction, modifiers, additions to or subtractions from an item requested by a customer, and/or any other suitable item information), employee information associated with a transaction (e.g., the employee code(s) for the cashier or associate who received the customer's order, the code(s) for production, expediter, and/or backer employees who handled a transaction during preparation, and/or any other suitable employee information), and/or any other suitable information relating to occurrences in a restaurant. Although ODS 108 is depicted in FIG. 1 as comprising only a single repository, the data included in ODS 108 may be physically and/or logically distributed across any suitable number of data stores. Further, data may be stored in ODS 108 using any suitable tool(s) and/or technique(s).

Event engine 110 shown in FIG. 1 also receives data produced by operational systems 105a-105n. In accordance with some embodiments of the invention, event engine 110 executes queries on data produced by operational systems 105a-105n to identify and summarize business metrics. (In the description that follows, business metrics may also be referred to as "events," although it is to be understood that an "event" may relate to more than one occurrence or transaction, or to no specific occurrence at all. The terms "event" and "metric" are used interchangeably herein.) Such metrics may be predefined, or defined dynamically based upon any one or more characteristics of data produced by operational systems 105a-105n. In some embodiments, event engine 110 may execute predefined queries on data produced by operational systems 105a-105n, so that queries need not be executed on ODS 108 to support later analysis. In this respect, it should be appreciated that ODS 108 may store large amounts of data, so that query execution may be time-consuming.

Event engine 110 may identify and/or summarize any suitable business metric(s) represented in the data produced by operational systems 105a-105n. Some basic examples include "speed of service" quantitative measures for specific intervals relating to a transaction (e.g., the amount of time between an order being opened and tender occurring, the amount of time between a make line position receiving the order and the order being "bumped" to the next position, the amount of time between an expediter receiving the order and the order being "bumped" to the next position, the amount of time between the order being received and customer delivery occurring, the total service time, the amount of time between a drive through order being received and pickup occurring, the amount of time between an order being ready and delivery occurring to the customer's table, home, or business, and/or any other suitable intervals), quantitative measures relating to "bump" activity for various food preparation stations (e.g., total preparation times for salads, Panini, sandwiches, and/or any other suitable "bump" measures), and quantitative measures relating to labor shifts (e.g., current and trending labor burn rate, current and trending production velocity, current and trending transaction counts, manager on duty, number of employees currently in training, and/or any other suitable labor shift metrics). In representative system 100, the results generated via the filtering and pre-analysis performed by event engine 110 are stored in event data 115. As with ODS 108, although event data 115 is depicted in FIG. 1 as comprising a single repository, the data stored thereby may be distributed, logically and/or physically, across any suitable number of data stores, and may be stored using any suitable tools and/or techniques.

In some embodiments of the invention, queries which are executed by event engine 110 may be defined using event interface 112. In this respect, in some embodiments of the invention, event interface 112 may enable a user (e.g., an analyst, executive, restaurant manager, and/or any other suitable human resource) to define constructs representing metrics to be captured by event engine 110. These constructs may be defined in any suitable way(s). Further, event interface 112 may be implemented using any suitable collection of hardware and/or software components. For example, event interface 112 may comprise a standalone application suitable for execution on a desktop computer (e.g., sitting in a restaurant manager's office), a web-based application running on a computer (e.g., server computer) accessible over a network (e.g., the Internet, a local area network, a wide area network, or some combination thereof), an "app" suitable for execution on a mobile device (e.g., a smartphone, tablet computer, and/or other mobile device), and/or any other suitable collection comprising hardware and/or software components. Embodiments of the invention are not limited to any particular manner of implementation.

In representative system 100, event data 115 is accessed by alert engine 120 to identify "alert conditions" represented in event data 115. An alert condition may, for example, be any condition which indicates an operational issue. In representative system 100, alert engine 120 executes queries on event data 115 to identify alert conditions. In some embodiments of the invention, the queries executed by alert engine 120 may be defined using alert interface 122. For example, alert interface 122 may enable a user (e.g., an analyst, executive, restaurant manager, and/or any other suitable human resource) to define constructs representing alert conditions to be captured by alert engine 125. As with event interface 112, alert interface 122 may be implemented using any suitable collection of hardware and/or software components, as embodiments of the invention are not limited in this respect.

Representative system 100 also includes video capture system 140, which may include one or more video capture devices (e.g., video surveillance cameras) for capturing video footage relating to occurrences in the restaurant, and audio capture system 150, which may include one or more video capture devices (e.g., microphones) for capturing audio relating to occurrences in the restaurant. For example, video capture system 140 may capture video recordings, and audio capture system 150 may capture audio recordings, of point of sale transactions, order preparation processes, dining areas, and/or any other suitable occurrences. Video capture system 140 stores video recordings in video repository 145, and audio capture system 150 stores audio recordings in audio repository 155. Video repository 145 and audio repository 155 may each comprise any suitable storage component(s), and employ any suitable storage technique(s), as the invention is not limited in this respect.

Representative system 100 also includes employee location data sources 160 configured to collect and provide data regarding the location of employees in the restaurant over time. Employee location data sources 160 may include, as examples, one or more RFID readers and tags (e.g., so-called "broad spectrum" RFID tags which emit unique frequencies and are designed to be read from a distance, tags which are designed to be read from shorter distances, a combination of the two types, and/or other types of tags), location-aware devices of location-based services configured for geo-fencing, workstations at which employees log in to perform assigned tasks, contact-based key and/or wand readers, Wi-Fi network access points, and/or any other suitable component(s). In some embodiments which are described in more detail below, one or more video capture devices (e.g., devices which form part of video capture system 140) may also collect and provide employee location data. In representative system 100, location data repository 165 stores employee location data collected by employee location data source(s) 160. Location data repository 165 may comprise any suitable storage component(s), and employ any suitable storage technique(s), as the invention is not limited in this respect.

In representative system 100, the video and audio recordings captured by video capture system 140 and audio capture system 150, and the employee location data captured by employee location data source(s) 160, may relate to events reflected in event data 115. In representative system 100, inference engine 130 is configured to correlate video recordings stored in video repository 145, audio recordings stored in audio repository 155, employee location data stored in location data repository 165, and/or event data 115. Correlation of video and/or audio recordings, employee location data, and/or event data may be performed for any of numerous reasons, such as to enable qualitative assessments of employee performance in certain roles, and/or to analyze the deployment of employees in the restaurant, as described further below.

II. Evaluating Employee Performance

Figure 2:
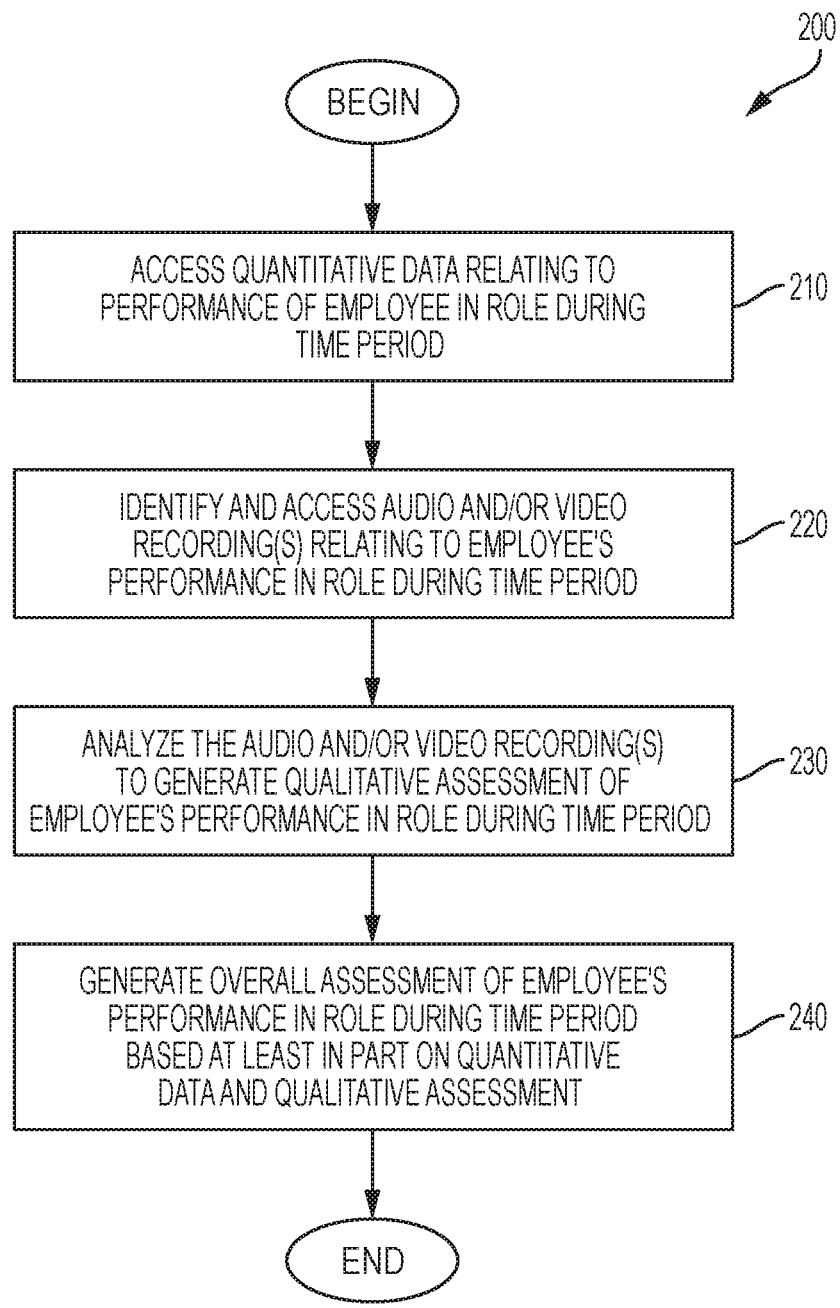
FIG. 2 is a flowchart of a representative process for assessing an employee's performance in a role in a restaurant, in accordance with some embodiments of the invention.

A representative process 200 for evaluating employee performance using qualitative assessments (e.g., enabled by correlating video and/or audio recordings with event data 115) and/or quantitative data (e.g., provided by analyzing event data 115) is shown in FIG. 2. Representative process 200 may be performed to evaluate an individual employee's performance in a particular role in a restaurant during a particular time period. At the start of representative process 200, quantitative data relating to the employee's performance in the role during the time period is accessed in the act 210. Such quantitative data may comprise any suitable measure(s) relating to any suitable number and type(s) of occurrence(s) in the restaurant, and may directly provide an indication of the employee's performance in the role during the time period, or indirectly provide such an indication. As examples, the quantitative data accessed in act 210 may comprise "speed of service" measures (such as the amount of time between an order being opened and tender occurring, the amount of time between a make line position receiving the order and the order being "bumped" to the next position, the amount of time between an expediter receiving the order and the order being "bumped" to the next position, the amount of time between a verbal order being received and delivery or pickup occurring, the total service time, the amount of time between a drive-through order being received and delivery or pickup occurring, the amount of time between a kiosk order being received and delivery or pickup occurring, the amount of time between an order being ready and delivery occurring to the customer's table, home, or business, the amount of time a cash register is open, and/or any other suitable intervals), measures relating to queues (e.g., the length of a line at a register, kiosk, drive-through station, etc.), measures relating to "bump" activity for various food preparation stations (e.g., preparation times for salads, Panini, sandwiches, and/or any other suitable "bump" measures), measures relating to labor shifts (e.g., current and trending labor burn rate, current and trending production velocity, current and trending transaction counts, manager on duty, number of employees currently in training, employee certifications, employee shift preferences, pay rates, break periods, availability, and/or any other suitable labor shift metrics), and/or any other suitable quantitative measure(s). Quantitative data may relate to individual occurrences within the restaurant, or be produced via statistical analysis of information on multiple occurrences (e.g., quantitative data may comprise a median, mean, minimum, maximum, standard deviation, and/or other interpretation of measures relating to multiple individual occurrences). Any suitable quantitative data may be accessed and/or analyzed, in any suitable way(s). In the representative system 100 shown in FIG. 1, inference engine 130 may access quantitative data stored in event data 115, generated by event engine 110 based on data produced by operational systems 105a-105n.

Representative process 200 (FIG. 2) then proceeds to act 220, wherein one or more audio and/or video recordings which relate to the employee's performance in the role during the time period are identified and accessed. In some embodiments, these audio and/or video recordings may be identified using techniques like those described in commonly assigned U.S. patent application Ser. No. 13/837,940, filed Mar. 15, 2013, entitled USE OF VIDEO TO MANAGE PROCESS QUALITY, which is incorporated herein by reference in its entirety. Some aspects of these techniques are summarized below.

In some embodiments, at least some of the records stored in event data 115 include date and time stamps. A date and time stamp for a record may indicate, for example, when the record was first produced and/or when it was stored in a repository. In some embodiments, the video recordings stored in video repository 145 and the audio recordings stored in audio repository 155 also include date and time stamps. As a result, the date and time stamp for an event record or an alert record may be correlated with corresponding video and/or audio recordings having corresponding date and time stamps.

Of course, a date and time stamp for video and/or audio recordings need not exactly match a date and time stamp for a correlated event record. For example, it may be desirable to retrieve video and/or audio recordings captured just before and/or just after an event was recorded or an alert was noted. For example, if the date and time stamp for an event record indicates that the event was recorded at a particular time, then video and/or audio recordings having a date and time stamp indicating they were captured starting thirty seconds prior to that time, and/or ending thirty seconds after that time, may be retrieved. The date and time stamps for an event and/or alert record and for corresponding video and/or audio recordings may have any suitable relationship and/or correspondence, as embodiments of the invention are not limited in this respect.

Information other than date and time stamps may also, or alternatively, be used to retrieve video and/or audio recordings which correspond to an event record. For example, if the data included in an event record to be analyzed indicates that it originated from a particular point of sale terminal, then this information may be used to identify the video and/or audio recordings which are to be retrieved (e.g., video footage depicting the terminal, audio recordings produced by a microphone at the terminal, etc.). Similarly, if the data included in an event record indicates that it originated from a kitchen management system, then this information may be used to identify the video and/or audio recordings to be retrieved (e.g., video and/or audio recordings of the restaurant's food preparation area). Any suitable information may be used to retrieve video recordings from video repository 145 and/or audio recordings from audio repository 155.

Representative process 200 then proceeds to act 230, wherein the audio and/or video recording(s) identified and accessed in the act 220 are analyzed to generate a qualitative assessment of the employee's performance in the first role in the restaurant during the time period. A qualitative assessment may be performed in any of numerous ways, and the result of a qualitative assessment may take any of numerous forms. In some embodiments of the invention, a qualitative assessment may be one which involves evaluating the quality with which the employee performs a function defined by the role. As such, it may involve appraising the employee's performance of the function at least in part through observation, as opposed to by objectively measuring his/her performance solely via data which is expressed numerically (as might be done to, for example, determine how quickly the function was completed, the extent to which it was completed, etc.). In this respect, a qualitative assessment may involve an estimation of the employee's performance of the function which is subjective, at least to some extent, such as a consideration of the employee's performance in relation to one or more preconceived notions of how the function should be performed. As such, in some embodiments, a qualitative assessment may be performed, at least in part, by a human actor, who may compare the employee's performance of the function to a mental model of how the function is to be carried out.

Of course, although a qualitative assessment is not performed using only quantitative data, it should be appreciated that the result of a qualitative assessment may be expressed numerically. For example, the result of a qualitative assessment may be a score which represents a level of quality with which the employee performed the function, and/or other information which is expressed numerically. It should also be appreciated that performing a qualitative assessment may involve taking into consideration information which is or can be expressed numerically. For example, qualitatively assessing the performance of a food preparation worker in making a salad may involve taking into consideration the amount of dressing the worker placed on the salad.

It should further be appreciated that, although a human may be involved in qualitatively assessing an employee's performance in some embodiments, the invention is not limited to being implemented in this manner. Moreover, if a human is involved in a qualitative assessment, that involvement may be at any suitable level, for any suitable purpose(s), and any other suitable component(s) (e.g., one or more computing components, which may execute programmed instructions) may also be involved in performing the qualitative assessment.

As noted above, a qualitative assessment may relate to evaluating an employee's performance of any of numerous functions in any of numerous roles. Some representative qualitative assessments may relate generally to food preparation accuracy (e.g., evaluating whether employees used specified ingredients in food items, used portioning tools correctly, assembled food items with ingredients added in the correct sequence, etc.), engendering warmth with customers (e.g., evaluating the manner in which a cashier greeted a customer, smiled at the customer, asked whether the customer is a member of a loyalty program, engaged the customer in conversation about something other than the transaction at hand, offered the customer a drink with his/her order, said "thank you" to the customer, etc.), cleanliness (e.g., evaluating the extent to which staff keep areas in the restaurant clean, such as dining room tables and chairs, dining room floors, trash containers and bus bins, drink stations, patio areas, washrooms, etc.), and/or other considerations. Any of numerous types of assessments may be performed to evaluate the quality with which an employee performs a particular function, and so the foregoing list should not be construed as exhaustive.

In some embodiments of the invention, the quality with which an employee performs a function may be defined, at least in part, by the business objectives of the enterprise and how performing the function supports the fulfillment of those objectives. For example, if a business objective of a restaurant is to encourage repeat customers and referrals by training employees in "customer-facing" roles to engender a feeling of warmth and satisfaction on the customer's part in every customer interaction, then the quality with which a cashier performs the function of interacting with customers may be evaluated, at least in part, upon his ability to engender such warmth and satisfaction. To measure the quality with which the employee performs this function, video and/or audio recordings of the employee at the cashier station which have been correlated with customer interaction events may be analyzed to determine whether the employee greeted each customer properly, engaged him/her in conversation about something other than the transaction (such as asking about his/her day, mentioning something about the weather, etc.), offered the customer side dishes, offered a drink upgrade, and/or otherwise followed one or more guidelines (e.g., cues in a script provided by restaurant management) to make the customer feel good about the interaction. Video and/or audio recordings may also be analyzed to determine whether the employee assigned to a cashier station thanked the customer for his/her business, provided him/her a beverage cup and directed her to the beverage machines, informed the customer what to do while waiting for his/her order to be prepared, etc.

The analysis of video and/or audio recordings may be performed in any of numerous ways. For example, as noted above, in some embodiments, recordings may be analyzed, at least in part, by a human actor. Alternatively or additionally, audio recordings may be processed using speech recognition tools. Such analysis and/or processing may be performed to identify words or phrases used by an employee and/or customer during an interaction, determine the presence or absence of specific words or phrases, evaluate the customer's and/or employee's tone, volume, pitch and/or speech rate before, during and/or after the interaction, and/or assess any other suitable sound or characteristic(s) thereof relating to an employee's performance in a role. Video recordings may be processed, for example, using image analysis tools to evaluate the number, characteristics and/or identify of people or other objects in a location at a particular time, facial expressions or mannerisms used by an employee and/or customer before, during and/or after an interaction, actions taken by an employee and/or customer before, during and/or after an interaction, and/or assess any other suitable characteristic(s) of moving images and/or accompanying audio which relates to an employee's performance in a role. Any suitable tool(s) and/or technique(s) may be used for this purpose, whether now known or later developed.

As another example of a qualitative assessment of an employee's performance in a role in a restaurant, if a business objective of the restaurant is to promote customer satisfaction by providing customers with a modicum of control over how their food is prepared, then the quality with which a cashier performs the function of communicating orders to food preparation staff may be evaluated based at least in part upon her ability to accurately convey information provided by the customer such as instructions relating to how he/she would like the order to be prepared. To measure the quality with which the employee performs this function, audio and/or video recordings of a cashier accepting a customer's order may be analyzed (e.g., by a human actor, and/or using one or more automated tools) to assess whether the cashier completely and accurately conveyed the details of the order to food preparation staff. As one example, information conveyed by the customer (e.g., as captured in the audio and/or video recordings) may be compared to information entered into a computer terminal by the cashier (e.g., stored in event data 115) and/or verbally communicated to food preparation staff (e.g., as may also be captured in the audio and/or video recordings).

It should be appreciated, of course, that qualitative assessments which relate to whether an employee completely and accurately conveys information to other employees need not relate to a cashier communicating order information to food preparation staff. Any communication of information, by any employee to any other employee(s), may be qualitatively assessed for this purpose.

Other representative forms of qualitative assessment may assist in verifying the accuracy of other (e.g., quantitative) data relating to an employee's performance. As an example, many restaurants capture quantitative data relating to how quickly food preparation workers complete customer orders, and today, this data is generally considered an important indicator of the performance of employees assigned to food preparation roles. However, the Assignee has recognized that in many restaurants, it is not uncommon for a particular employee to be assigned not only to a station on a food preparation production line, but also to an "expediter" role (e.g., to complete final assembly of customer orders, check order accuracy, ensure food preparation staff in different areas did their job in preparing orders that meet customer specifications, etc.) at the same time. The Assignee has also recognized that when an employee has this dual role, it is not uncommon for him/her to prematurely indicate that the individual stage of food preparation assigned to him/her at his/her station has been completed, and then use the time allotted to him/her as "expediter" to complete this stage. By indicating that the assigned stage of food preparation has been completed before it actually has, the employee can make it appear to management (i.e., based only on quantitative data) that he/she is performing in this role at an above-average level, when in fact he/she may be performing at an average or below-average level. This type of premature indication that a task has been completed when it actually hasn't can skew operational data, restricting management's ability to diagnose operational issues, improve processes over time, and identify employee training opportunities. As such, in some embodiments of the invention, video and/or audio recordings of occurrences in the restaurant may be analyzed (e.g., compared to information produced by operational systems on those same occurrences) to determine whether an employee prematurely indicated the completion of a task. This type of analysis may be performed in any of numerous ways, on any of numerous types of tasks. Using the example given above to illustrate, if operational data indicates that a food preparation task has been completed much more quickly than expected, and if the employee assigned to the task is also assigned to an "expediter" role, then audio and/or video recordings of the task may be analyzed to determine whether the task was actually completed in the amount of time indicated by the employee, and if not, the employee may be advised of the importance of accurate operational data.

It should be appreciated that the act 230 may involve making multiple qualitative assessments, to evaluate how an employee performs each of multiple functions. Using the example of the cashier given above to illustrate, a first qualitative assessment in the act 230 may relate to how the cashier interacts with customers, and a second qualitative assessment in the act 230 may relate to how well he/she accurately communicates information to food preparation staff. In this respect, some embodiments of the invention recognize that many employees are asked to perform more than one function in a given role, and may perform some functions better than others at any given stage in his/her development.

It should be appreciated that the foregoing examples are provided to illustrate some of the ways that different forms of qualitative assessment may assist in evaluating an employee's performance in a role. Of course, the examples given above do not constitute an exhaustive list, as any of numerous forms of qualitative assessment may assist in evaluating employee performance, in any of numerous ways. The invention is not limited to being implemented in any particular fashion.

Returning to FIG. 2, at the completion of act 230, representative process 200 proceeds to act 240, wherein an overall assessment of the employee's performance in the role is generated based at least in part on the qualitative assessment(s) generated in the act 230 and the quantitative measure(s) accessed in the act 210. Such an overall assessment of the employee's performance may assist in determining whether the employee is the best candidate to assume the role at some future time, whether the employee should continue in the role now, and/or in making any other suitable determination(s). At the completion of act 240, representative process 200 completes.

Figure 3:
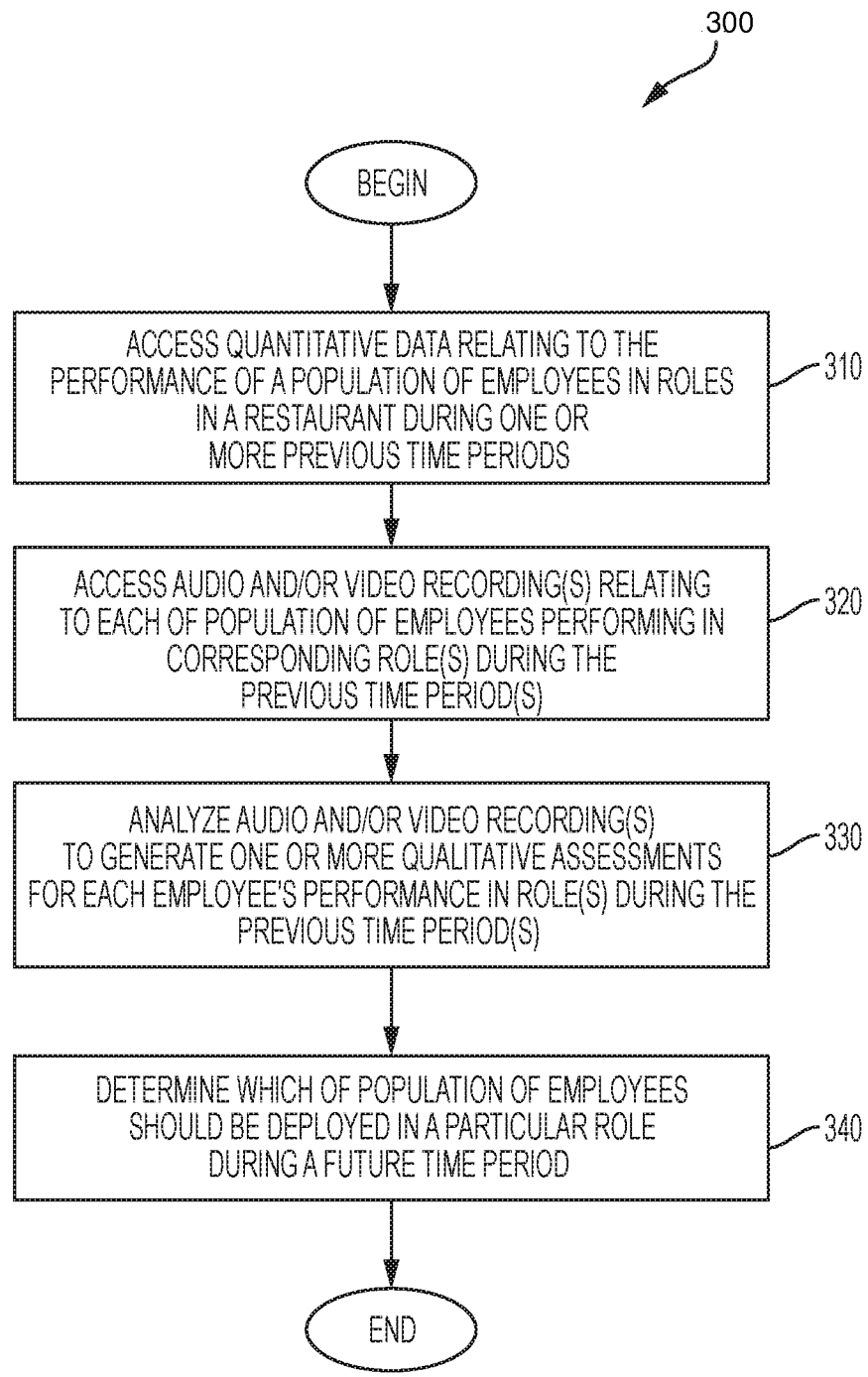
FIG. 3 is a flowchart of a representative process for determining which of a plurality of employees should perform a given role in a restaurant at a given time, in accordance with some embodiments of the invention.

Some embodiments of the invention may use qualitative assessments to not only evaluate the performance of individual employees in a particular role, but also to identify the employees that should be assigned to particular roles in subsequent time periods. In this respect, some embodiments may enable problems associated with particular employees being deployed in roles for which those employees are not well-suited to be avoided, by ensuring that employees are assigned to roles for which they are well-suited. FIG. 3 depicts a representative process 300 which employs qualitative assessments to determine which of a population of employees should be assigned to a particular role at a given time in the future.

At the start of representative process 300, quantitative data relating to the performance of a population of employees in various roles in a restaurant during one or more previous time periods is accessed. This quantitative data may be accessed using any suitable tools and/or techniques. For example, as described above with reference to act 210 of representative process 200 (FIG. 2), act 310 may involve inference engine 130 (FIG. 1) accessing event data 115 which is generated by event engine 110 based upon information supplied by operational systems 105a-105n. The previous time period(s) may include any suitable quantity of time intervals, spanning any suitable length of time.

Representative process 300 then proceeds to act 320, wherein one or more audio and/or video recordings relating to each of the population of employees performing in one or more corresponding roles during the previous time period(s) is accessed. Like act 310, act 320 may also be performed using any suitable tool(s) and/or technique(s). For example, as described above with reference to act 220 of representative process 200, act 320 may involve inference engine 130 accessing one or more audio recordings stored in audio repository 155 and/or one or more video recordings stored in video repository 145 which correlate to event records stored in event data 115. As an example, act 320 may involve using date and time stamps to correlate audio and/or video recordings and corresponding event records.

Representative process 300 then proceeds to act 330, wherein the audio and/or video recording(s) are analyzed to generate one or more qualitative assessments for each of the population of employees performing in one or more roles in the restaurant during the previous time period(s). As discussed above with reference to representative process 200, a qualitative assessment may take any of numerous forms, and be generated in any of numerous ways. For example, act 330 may involve analyzing audio and/or video recordings collected during one or more previous periods to qualitatively assess how employees have performed one or more functions in cashier roles, food preparation roles, "expediter" roles, and/or other roles during the period(s). The qualitative assessment(s) generated in act 330 for each employee may include an assessment of his/her performance during the overall period(s) examined, an assessment of his/her performance during a subset of the periods (if more than one previous period is examined), an assessment of his/her development (e.g., improvement in one or more areas) over the course of time (if more than one previous period is examined), and/or take any other suitable form(s).

Representative process 300 then proceeds to act 340, wherein a determination is made, based at least in part on the qualitative assessment(s) generated in the act 330 and the quantitative data accessed in the act 310, which of the population of employees should be deployed in a particular role during a future time period. This may involve identifying a single employee to serve in the role in the future time period or, if the role may have multiple employees assigned thereto at any one time, identifying the multiple employees to serve in the role. Of course, if multiple employees are identified to serve in a role, they need not serve in the role during the same time period. The time period during which a first identified employee is to serve in the role may overlap to any suitable extent with a time period during which a second identified employee is to serve in the role.

In some embodiments, the future time period may not be immediately after representative process 300 is performed. As such, representative process 300 may be performed, for example, to define an employee deployment model for the restaurant for some time period in the future, including identifying which employees are asked to work during this time period, and which employees are assigned to which roles and for how long.

In some embodiments, however, the future time period may be immediately after representative process 300 is performed, so that the act 340 may involve determining which of a population of employees currently working in a restaurant is best suited to assume a particular role immediately thereafter. If an employee is currently assigned to the role being evaluated, representative process 300 may be performed to determine whether and when that employee should be replaced in the role, who should assume the role in that employee's place, the role to which the employee should be reassigned, and to which role an employee currently assigned to that other role should be next assigned. Thus, it should be appreciated that representative process 300 may be performed to define and/or redefine the employee deployment model for a restaurant, dynamically and based on quantitative and qualitative data that may be gathered in real time.

It should also be appreciated that a decision to replace an employee in a particular role may be based on an evaluation of that employee's performance in that role, an evaluation of another employee's projected future performance in the role, some combination of these considerations, and/or other information. For example, in some embodiments, a determination may be made to reassign an employee from a particular role if his/her performance in that role falls below a certain threshold level (which may be predetermined, or dynamically defined, in any suitable fashion) based on quantitative and qualitative data which is gathered in real time. In some embodiments, the other employee that is to replace that employee in the role may be identified through an analysis of quantitative and qualitative data relating to that other employee's previous performance, in that role and/or other roles. Numerous uses and applications for a process of evaluating the performance of a population of employees in various roles may be envisioned, and embodiments of the invention may be implemented in any of numerous ways.

At the completion of the act 340, representative process 300 completes.

In some embodiments of the invention, employees may be automatically redeployed from one role to another in a restaurant without manual intervention by a manager. This may be performed in any of numerous ways. For example, inference engine 130 may be configured to electronically notify an employee that he/she is being reassigned to another role, automatically logged off the workstation at which he/she is currently working, and prompted to report to a different station where he/she may be allowed to log in.

Of course, the invention is not limited to reassigning employees automatically without a manager's intervention. For example, in some embodiments, a manager may be notified (e.g., as a result of the execution of an automated routine) that an employee currently assigned to a first role may be better suited to a second role than another employee currently assigned to the second role, and may be prompted to consider reassigning the employees. The manager may then decide whether to reassign the employees or not. If the manager opts to not reassign the employees, this decision may be logged, and may later be analyzed in evaluating the restaurant's operations and/or the performance of the manager and/or the employees.

In other embodiments, a manager may be notified that employees will be reassigned automatically if he/she does not override the decision within a certain period of time. Any suitable technique(s), including automatic, semi-automatic, and/or manual technique(s) may be employed, as the invention is not limited in this respect.

In some embodiments, a determination that a particular employee is best suited to assume a particular role may influence, wholly or in part, which employees are called into work if it is determined that the restaurant is currently understaffed. For example, if it is determined that a particular employee who is not currently working is well-suited to assume an "expediter" role, and there is a current need for an additional employee in that role, then the employee may be called into work. The employee may, for example, be called in automatically. For example, inference engine 130 may be configured to automatically contact the employee (e.g., send the employee a text, email and/or voice message) to determine whether he/she is available to work, process and log a response from the employee, and schedule the employee to work if warranted. In some embodiments, if it is determined that an employee that is well-suited for a particular role is unavailable to come into work, then another employee (e.g., the next-best suited employee for the role) may be identified and contacted (e.g., automatically as described above, or in some other fashion).

Of course, the invention is not limited to considering only employees who are not currently working for roles in an understaffed restaurant. For example, if the employee who is determined to be well-suited to take on the "expediter" role in the example above is currently working as a cashier, then in some embodiments, that employee may be reassigned to the "expediter" role, and a determination may be made (e.g., based at least in part on an analysis of quantitative and qualitative information, on employees currently working and/or employees not currently working) which other employee (whether currently working or not) is well-suited to assume the cashier role in his/her place.

An identification of an employee as being well-suited to assume a particular role may be based on any suitable information. For example, if it appears from an analysis of quantitative and qualitative information that a particular employee who is not currently working is best suited to assume an "expediter" role, but other information indicates that calling that particular employee into work would necessitate paying him/her overtime pay and there are less costly alternatives available (e.g., an employee who is currently working), then the employee who is not currently working may not be selected for the role.

Although the foregoing examples relate to a qualitative assessment of an employee's performance in a role being based on an analysis of audio and/or video recordings, it should be appreciated that the invention is not limited to using only this type of information, and that any suitable type of information may be used in generating a qualitative assessment. For example, some embodiments of the invention may employ customer survey responses to qualitatively assess an employee's performance in a role. In this respect, some restaurants invite customers to respond to an online survey about their experience, and the online survey is accessed using information (e.g., a universal resource locator, or URL) that allows the restaurant to correlate the customer with a particular transaction or order. If the customer indicates on the survey that he/she was greeted warmly by the cashier but that his/her food was overcooked, this may influence qualitative assessments of the cashier and of the food preparation employee that prepared the order, and these assessments may influence the roles to which these employees are assigned in the future.

III. Analyzing Employee Deployment

Some embodiments of the invention are directed to analyzing the deployment of employees in a restaurant, and more particularly to determining whether employees are working at the stations to which they have been assigned, according to prescribed standards and procedures. In this respect, the Assignee has appreciated that a number of conventional tools may enable the location of individual employees in a restaurant to be tracked over time, and that these tools may allow the area defining a station to which an employee is assigned to be defined, so that conventional tools may be used to determine when an employee has vacated a station to which he/she has been assigned. The Assignee has also appreciated that if individual employees are not working in the stations to which they have been assigned according to prescribed standards and procedures, the speed at which customer orders are fulfilled and the overall throughput of the restaurant may be significantly diminished.

The Assignee has also recognized, however, that in some circumstances it may be appropriate for an employee to leave his/her assigned station, for a number of reasons. For example, there may be no work for the employee to perform in an assigned station at a given time, there may be tasks which he/she has been asked to perform which require him/her to temporarily leave the station, or there may be an emergency in the restaurant at which the employee's assistance is needed. As such, some embodiments of the invention are directed to determining whether an employee who has vacated his/her assigned station acted appropriately in doing so, based on the circumstances present in the restaurant at that time. If it is determined that the employee acted inappropriately, then the employee may, for example, be automatically redirected back to the assigned station by sending electronic notifications to the employee and/or his/her manager, ceasing the flow of work to the station to which the employee has improperly migrated, automatically logging the employee off a terminal at a station to which the employee has improperly migrated, and/or taking any of numerous other automatic redirection actions.

In some embodiments, the information which is used to determine whether an employee acted appropriately in leaving his/her assigned station includes (but is not limited to) one or more video recordings depicting events occurring in the restaurant at the time the employee left the station. The video recording(s) may depict the employee, the station, one or more areas around the station, one or more other areas in the restaurant, the exterior of the restaurant, and/or any other suitable setting(s) or object(s). The video recording(s) may be analyzed, in any of numerous ways, using manual, semi-automated and/or automated techniques. The analysis of the video recording(s) may, for example, provide valuable context which can be helpful in determining whether the employee acted appropriately at the time in question.

In this respect, the Assignee has recognized that there may be a number of reasons why leaving an assigned station may be appropriate given circumstances in the restaurant. For example, some restaurants may ask employees who are assigned to cashier stations to perform certain tasks in other areas of the restaurant depending on the content of customer orders and current conditions in the restaurant. As an example, a restaurant with a coffee drink preparation ("barista") area which is in a different area than the restaurant's cashier stations may specify that if a cashier receives a customer order which includes a coffee drink, the cashier is to leave the cashier station after entering the order and walk the customer to the barista area to prepare the coffee drink, unless there is currently a line of customers at the barista station, in which case the employee is to ask the customer to walk to the barista station to retrieve the coffee drink himself/herself after it is made by another employee. Thus, in this example, a determination whether the employee acted appropriately in leaving the cashier station is based on operational data indicating the content of a customer's order (e.g., whether or not the order included a coffee drink, as captured from the cashier workstation and indicated in event data 115 (FIG. 1)) and video which depicts whether or not there was a line at the barista station at the time the customer's order was received (e.g., as captured by video capture system 140 and stored in video repository 145 (FIG. 1)). Only by reviewing this additional information can it be determined whether circumstances warranted the employee leaving his/her station.

As another example, some restaurants assign employees to so-called "slide" positions in which the tasks assigned to an employee depends on current conditions in the restaurant. For example, an employee may be assigned to a slide position in which he/she is to give first priority to taking customer orders at a cashier station, but if there are no customers waiting to give orders, he/she is to make coffee drinks for customers at a barista area in another part of the restaurant, and if there are no customers waiting for coffee drinks, then he/she is to tidy a case in another part of the restaurant which displays baked goods. In this example, a determination whether the employee improperly left his/her station may consider video recordings showing whether or not there were any customers in line, operational data indicating whether any coffee drink orders were pending, and/or other information.

It should be appreciated that a determination whether an employee acted appropriately in leaving his/her assigned station may be made in any of numerous ways, using any of numerous types of information. In some embodiments, this information may include video depicting events occurring in the restaurant at or around the time the employee left his/her assigned station, but other embodiments may not employ video recordings.

It should also be appreciated that an analysis of employee deployment may relate to employees assigned to any suitable roles. In embodiments which are deployed in a restaurant, deployment analysis may relate to cashiers, food preparation staff, table runners, bussers, dishwashers, expediters, technical support staff, and/or employees assigned to any other suitable role(s).

Figure 4:
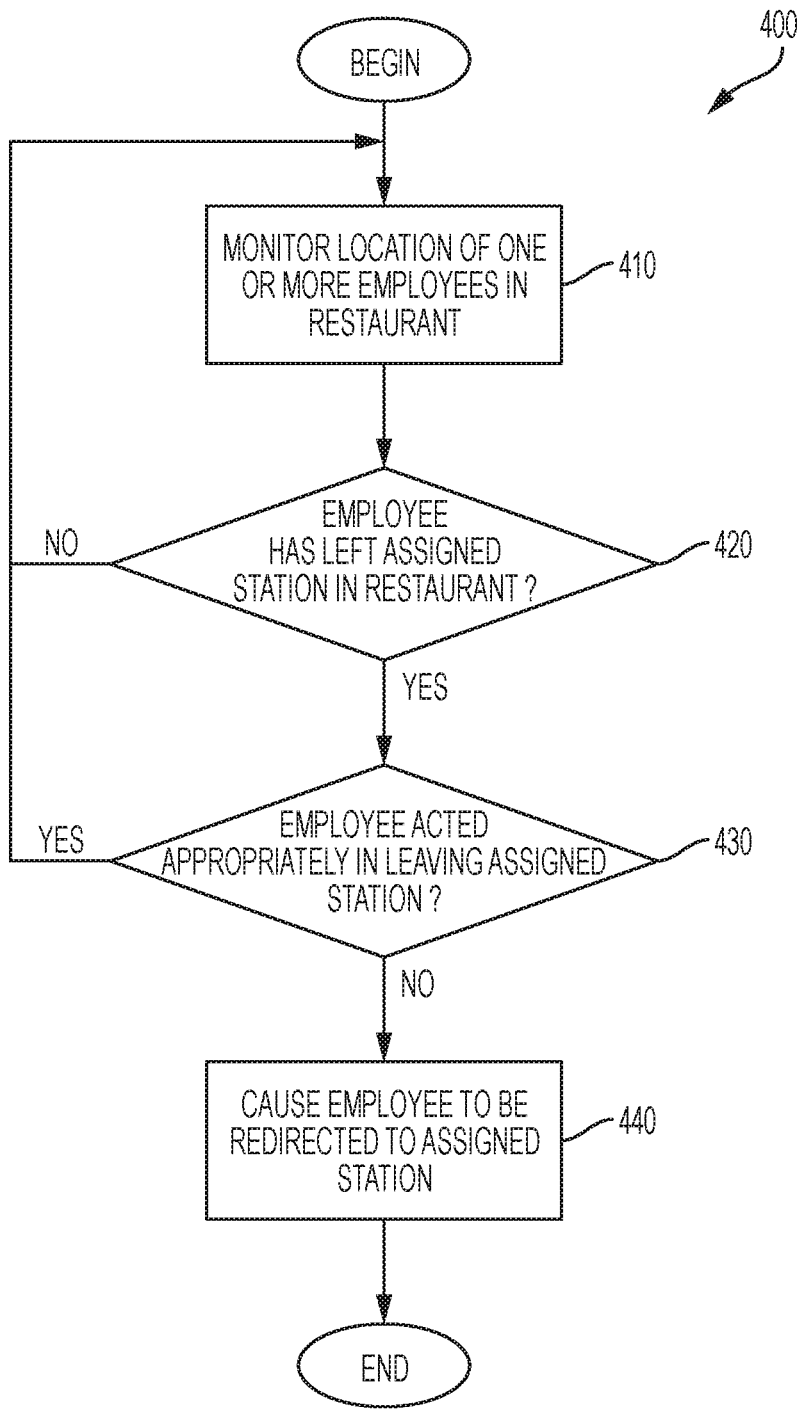
FIG. 4 depicts a representative process for analyzing the deployment of employees in a restaurant.

FIG. 4 depicts a representative process 400 for analyzing the deployment of employees in a restaurant. Representative process 400 may be performed, for example, to determine whether an employee who left his/her assigned station acted appropriately in doing so. At the start of representative process 400, the location of one or more employees working in a restaurant is monitored. This may be performed in any of numerous ways, using any suitable tool(s) and/or technique(s). For example, employee location data source(s) 160, shown in FIG. 1, may be used to collect and provide data on the location of one or more employees in a restaurant over time. The employee location data which is captured by employee location data source(s) 160 may be stored in location data repository 165 and processed by inference engine 130.

The employee location data source(s) 160 may consist of any suitable component(s). For example, RFID readers and tags, location-aware devices of location-based services configured for geo-fencing, workstations at which employees log in to perform assigned tasks, contact-based key and/or wand readers, Wi-Fi network access points, and/or any other suitable component(s) may be used to collect employee location data. Further, components which track and record employee location based upon the receipt of a signal may be implemented in any suitable way. For example, embodiments which use RFID technologies for tracking employees' location may employ so-called "broad spectrum" RFID tags which emit unique frequencies and are designed to be read from a distance, tags which are designed to be read from shorter distances, a combination of the two types of tags, and/or any other suitable tool(s). Any of numerous modes of implementation may be employed, as the invention is not limited in this respect.

Additionally or alternatively to the tracking components listed above, some embodiments of the invention may employ one or more video capture devices (e.g., devices which form part of video capture system 140, shown in FIG. 1) to track the location of employees within a restaurant. For example, some embodiments may provide for one or more "digital boundaries" to be established around or within the frame of view of a video camera, as is known in the art. Additionally or alternatively, some embodiments may employ digital recognition technologies to identify people and/or objects which are shown within the frame of view of a video camera. Using such tools, the images which are captured by a video camera may be analyzed to determine whether or not any people are present within an established digital boundary at a given time, and/or the identity of any one or more of the people shown. This information may be used to track, for example, the location and movement of employees within the restaurant over time.

At the completion of the act 410, representative process 400 proceeds to act 420, wherein a determination is made, based upon the data that was captured in the act 410 by employee location data source(s) 160 and/or video capture system 140, whether an employee has left his/her assigned station in the restaurant. Recognizing that an employee's "station" may take any of numerous forms, shapes and sizes within the restaurant, this determination may be made in any of numerous ways, using any suitable tool(s) and/or technique(s). For example, an employee assigned to a food preparation role may work in a small area nearly shoulder-to-shoulder with other staff in a food preparation area, while an employee assigned to a cashier role may be assigned to an area roughly three feet by three feet next to a cashier workstation, and an employee assigned to an expediter role may roam about a wide area in the restaurant preparing food for final delivery to a customer. Determining whether an employee has vacated his/her station may take into account the size, shape and area which the station occupies.

Additionally, in some embodiments, the boundaries defining an employee's station may vary based on a number of considerations. For example, in some embodiments, the boundaries defining the stations assigned to one or more employees may vary based on circumstances in the restaurant. As an example, the boundaries defining the stations to which some employees are assigned may expand to encompass more area during busy periods, to allow those employees the freedom to move about the restaurant to attend to customers' needs, while the boundaries defining the stations to which other employees are assigned may shrink during busy periods, to ensure that certain key processes are performed as designed so as to maintain speed of service. Any of numerous considerations may affect how the boundaries of a station vary over time.

If it is determined in the act 420 that the employee has not vacated his/her station, then representative process 400 returns to act 410, so that the employee's location can continue to be monitored. However, if it is determined in the act 420 that the employee has vacated his/her station, then representative process 400 proceeds to act 430, wherein a determination is made whether the employee acted appropriately in doing so.

A determination whether an employee acted appropriately in vacating his/her station may be made in any of numerous ways, based on any of numerous types of information. As noted above, this determination may be based in part on an assessment of circumstances in the restaurant at the time the employee left the station, and/or other data providing context for the employee's decision. As such, video depicting events occurring in the restaurant at the time the employee left the station, operational data describing events occurring at the time the employee left the station (e.g., relating to the content of customer orders), and/or any other suitable type(s) of information may be considered in making this determination.

In embodiments in which more than one type of information is considered in determining whether the employee acted appropriately in leaving his/her assigned station, different types of information may be correlated using date and time stamps, as described above with reference to FIG. 1. For example, in some embodiments, at least some of the records stored in location data repository 160 may include date and time stamps which indicate (for example) when a record was produced and/or stored, at least some of the video recordings stored in video repository 145 may include date and time stamps which indicate (for example) when a recording was created and/or stored, and at least some of the operation data stored in event data 115 may include date and time stamps which indicate (for example) when an operational data record was created and/or stored. The respective date and time stamps may be used to correlate different types of records and/or recordings, so as to ascertain the circumstances present in the restaurant when the employee left the station.

Various factors may be considered in determining whether an employee acted properly in leaving his/her assigned station. For example, if video recordings and/or operational data indicate that there was no work for the employee to perform in the assigned station at the time he/she left (so that leaving the station allowed him/her to remain productive until there was work to perform at the assigned station), indicate that there were tasks which he/she was asked to perform which require him/her to leave the station, indicate that there was an emergency in the restaurant at which the employee's assistance was needed, and/or indicate that there were other mitigating circumstances present in the restaurant at the time he/she left the assigned station, any of all of these may whether he/she is determined to have acted appropriately.

It should be appreciated that this determination may be made in an automated, semi-automated or manual fashion. For example, if video depicting events in the restaurant is analyzed to determine whether the employee acted appropriately, the analysis may be performed by an automated procedure, by a human operator, or using a combination of automated and manual techniques. Operational data and/or other information may be analyzed or considered using any suitable tool(s) and/or technique(s).

In some settings, a determination that an employee has improperly left his/her assigned station in a food preparation area may indicate that prescribed food preparation procedures are not being followed. For example, the Assignee has recognized that food preparation staff sometimes do not follow the "production line" model prescribed for the preparation of certain food items, and that after completing a task as part of preparing a food item in a production line model some employees may move with the food item to the next station in the line, and perform the next task associated with that station rather than passing the food item to the worker assigned to that station as prescribed, so that the worker assigned to that station can perform the task. The Assignee has also recognized that when this occurs, the integrity of food preparation processes (which are typically designed to maximize efficiency and throughput in the restaurant) is compromised, and the speed at which customer orders are fulfilled is often significantly affected. Given that the financial performance of many restaurants is heavily influenced by employee throughput, compromised operational integrity leading to diminished speed of service can have a significant negative effect on a restaurant's performance. Thus, the Assignee has recognized that quickly and accurately detecting when an employee has inappropriately left his/her assigned station in a restaurant may improve the restaurant's financial performance.

If it is determined in the act 430 that the employee has not acted inappropriately in vacating his/her assigned station, then representative process 400 returns to act 410, and repeats as described above. However, if it is determined in the act 430 that the employee has acted inappropriately in vacating his/her station, then representative process 400 proceeds to act 440, which involves causing the employee to be redirected to his/her assigned station.

Redirecting an employee to his/her station may be performed in any of numerous ways. For example, some embodiments may provide for automatically alerting the employee that he/she has inappropriately left his/her assigned station and should return. For example, in some embodiments, inference engine 130 (FIG. 1) may be configured to issue electronic notifications, such as notifications which are addressed specifically to the employee rather than being broadcast to all employees. Electronic notifications may be addressed to specific employees in any of numerous ways. For example, some embodiments may provide for notifications to be addressed to a device operated by the employee, like a workstation which is at or near the location to which the employee has improperly migrated, or a smartphone or other mobile device operated by the employee. As one example, if an employee has improperly migrated to a cashier station and logged on to a terminal there, then an electronic notification may be sent for display on the terminal screen to notify the employee that he/she should return to his/her assigned station. As another example, if it is determined based on employee location data captured in the act 410 that an employee has migrated from a table runner station to a particular spot in the food preparation area, then an electronic notification may be addressed to a monitor located at or near that spot.

Redirecting an employee to his/her station may also, or alternatively, be accomplished by automatically ceasing the flow of new work to a station to which the employee has improperly migrated. For example, if an employee has improperly migrated to a food preparation station at which information on pending orders is displayed on a monitor, then inference engine 130 may cause information on new orders to stop being sent to the monitor, so that the employee is forced to return to his/her assigned station by virtue of having no work to perform at the station to which he/she migrated.

Redirection may also, or alternatively, be accomplished by automatically logging the employee off a workstation at a location to which he/she has improperly migrated. Continuing with the example given above of the employee who has improperly migrated to a cashier station to illustrate, if after being notified to return to his/her station the employee continues to work at the cashier station, then inference engine 130 may cause the employee to be automatically logged off the terminal at the cashier station so that he/she is encouraged to return to his/her assigned station.

Of course, redirection of an employee to an assigned station need not be performed automatically. For example, in some embodiments, an employee may be redirected by notifying the employee's manager that he/she has improperly left his/her assigned station. Notification may be accomplished, for example, using the techniques described above with respect to electronically notifying employees, and/or using other techniques, such as by sending a notification for display on a manager's electronic dashboard.

In some implementations, notifying a manager that an employee has improperly left an assigned station, rather than automatically redirecting the employee, may enable the manager to handle unusual circumstances in the restaurant. For example, if a large number of customers all arrive at the restaurant at once, and the manager determines that some employees should temporarily help with tasks which are unrelated to their previously assigned duties, then allowing the manager to determine where employees work rather than automatically redirecting the employees back to their assigned stations may enable the manager to deal with the situation in the manner which seems most effective to him/her at the time.

Some embodiments of the invention may provide for notifying an employee's manager in or near real-time when the employee improperly vacates his/her assigned station, so that the manager may respond as quickly as possible to minimize the effect on the restaurant's performance. For example, in some embodiments, inference engine 130 may be configured to analyze operational data stored in event data 115, location data stored in location data repository 165, and/or video recordings stored in video repository 145 as the different types of information are collected and stored so as to enable notifications to be sent in or near real-time to restaurant managers.

At the completion of act 430, representative process 400 ends.

It should be appreciated that the functionality described above whereby a determination is made whether an employee has improperly left his/her assigned station may also be used to determine whether an employee which has been reassigned from one station to another (e.g., as a result of the processing described above with reference to FIGS. 2 and 3) has reported to their new station and/or continues to work at the new station after reassignment. For example, operational data stored in event data 115, location data stored in location data repository 165, and/or video recordings stored in video repository 145 may be analyzed after an employee has been reassigned to determine whether the employee reported to a new station on a timely basis, continues to work in that role after some predefined time period has passed, etc.

IV. Implementation Details

It should be appreciated that the representative processes described above with reference to FIGS. 2, 3 and 4 are merely examples of processes for performing the described functions, and that any of numerous variations on these representative processes are possible. For example, variations on any of all of representative processes 200, 300 and 400 may include acts not described above, may not include all of the acts described above, and/or may include acts described above being performed in a different sequence than that which is described above.

It should also be appreciated that although many of the foregoing examples relate to analyzing the operations of a restaurant, the invention is not limited to being used in this manner. Aspects of the invention may be employed in analyzing the operations of any suitable entity, employing any suitable resource (whether human or not, and whether considered an employee according to the law of the applicable jurisdiction(s) or not).

It should further be appreciated that although a single representative system 100 (FIG. 1) is described above as being used in a single restaurant to provide the functionality described, the invention is not limited to this mode of implementation. For example, a system implemented in accordance with the invention for analyzing restaurant operations may evaluate data collected in multiple restaurants, or multiple systems may be used to analyze the operations of a single restaurant. Any suitable mode of implementation may be used.

Additionally, it should be appreciated that although examples given above with reference to FIGS. 2 and 3 relate to using a combination of quantitative data and qualitative assessments to evaluate employee performance, the invention is not limited to doing so. For example, in some embodiments, only qualitative assessments, or only quantitative data, may be used to evaluate the performance of one or more employees.

Figure 5:
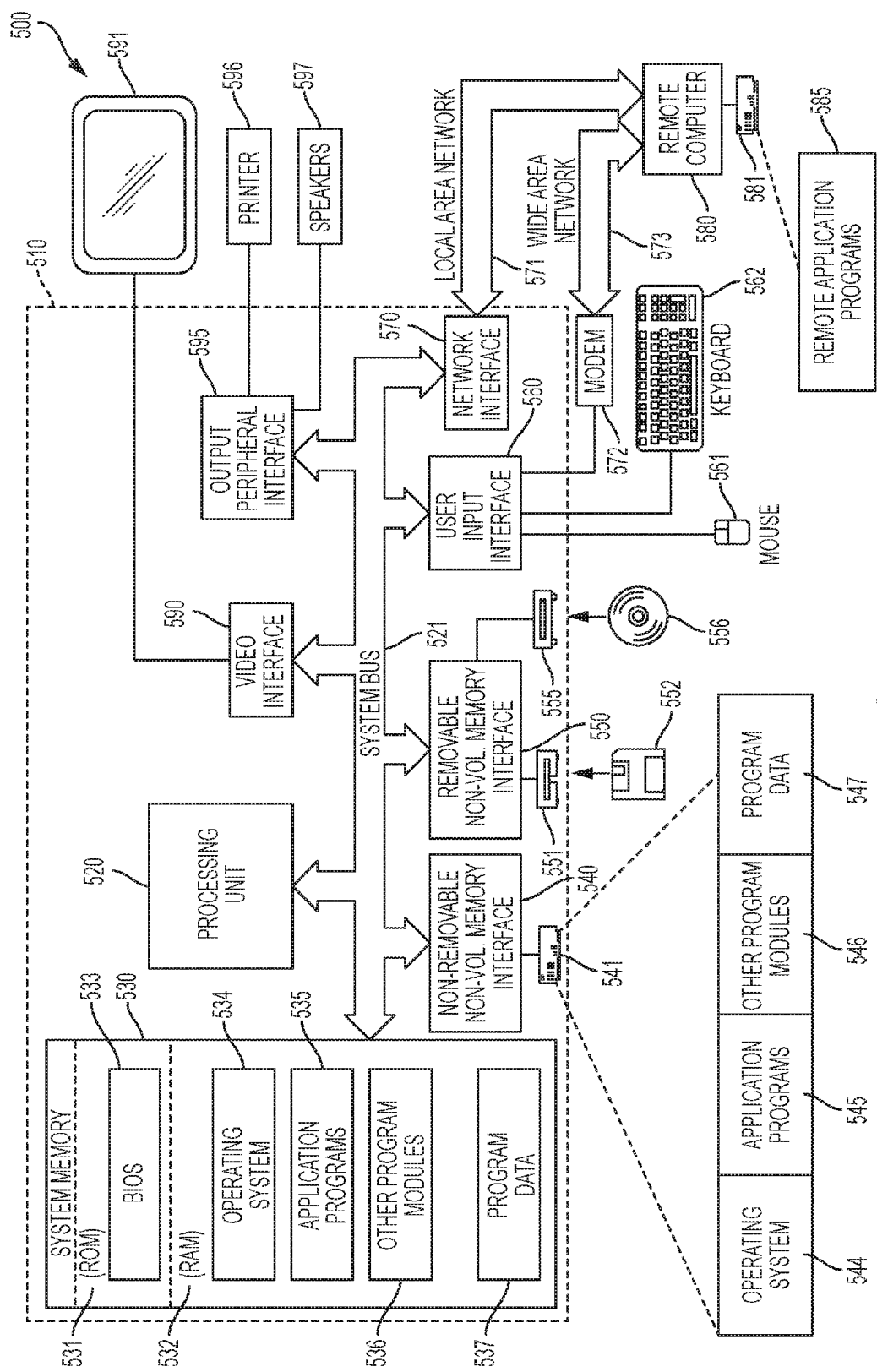
FIG. 5 shows an example computing system environment for implementing some aspects of the invention.

As should be apparent from the foregoing description, some aspects of the invention may be implemented using a computing system. FIG. 5 illustrates an example of a suitable computing system environment 500. The computing system environment 500 shown in FIG. 5 is only one example of a computing environment suitable for implementing aspects of the invention, and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 5, an example system for implementing the invention includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through an non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through a output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system for use in analyzing deployment of employees in a restaurant, the system comprising:
    at least one employee location data source;
    at least one recording device configured to capture video recordings of occurrences in the restaurant;
    at least one computer-readable storage medium having instructions recorded thereon; and
    at least one processor, programmed via the instructions to:
        determine, based at least in part on data from the at least one employee location data source, that an employee vacated a station in the restaurant to which the employee is assigned during a particular time period;
        determine whether the employee improperly vacated the station based at least in part on an analysis of a video recording captured by the at least one recording device, the analysis relating to identifying whether one or more predefined conditions existed in the restaurant at a time when the employee vacated the station;
        if it is determined that the employee improperly vacated the station, cause the employee to be redirected back to the station;
    wherein the at least one processor is programmed to determine that the employee left the station for another location at which a workstation to which employees log on is located, the workstation comprising a monitor, and to cause the employee to be redirected back to the station by electronically sending a message for display on the monitor to notify the employee that he/she is to return to the station and automatically logging the employee off the workstation.

2. The system of claim 1, wherein the at least one employee location data source comprises a radio frequency identification (RFID) reader configured to receive signal from an RFID tag transported by the employee.

3. The system of claim 2, wherein the RFID reader is deployed at or near the station to which the employee is assigned during the particular time period.

4. The system of claim 1, wherein the at least one employee location data source comprises at least one location-aware device of a location-based service configured for geofencing.

5. The system of claim 1, wherein the at least one employee location data source comprises at least one workstation to which employees log on to perform work.

6. The system of claim 1, wherein the video depicting the restaurant during the particular time period depicts the employee.

7. The system of claim 1, wherein the video depicting the restaurant during the particular time period depicts one or more cashier stations at which customers queue.

8. The system of claim 1, wherein the video depicting the restaurant during the particular time period depicts a food preparation area in which multiple employees prepare food.

9. The system of claim 1, wherein the at least one processor is programmed to determine whether the employee improperly vacated the station based at least in part on data collected by at least one operational data system at or near the station.

10. The system of claim 9, wherein the at least one operational data system comprises a cashier workstation configured to receive input describing customer orders.

11. The system of claim 1, wherein causing the employee to be redirected back to the station comprises ceasing sending work to the other location.

12. The system of claim 1, wherein causing the employee to be redirected to the station comprises electronically notifying the employee's manager that the employee has improperly vacated the station.

13. A method for use in a system comprising at least one employee location data source and at least one recording device configured to capture video recordings of occurrences in a restaurant, the method comprising acts of:
    (A) determining, based at least in part on data from the at least one employee location data source, that an employee vacated a station in the restaurant to which the employee is assigned during a particular time period;

(B) determining whether the employee improperly vacated the station based at least in part on an analysis of a video recording captured by the at least one recording device, the analysis relating to identifying whether one or more predefined conditions existed in the restaurant at a time when the employee vacated the station;

(C) if it is determined that the employee improperly vacated the station, causing the employee to be redirected back to the station;

wherein the act (B) comprises determining that the employee left the station for another location at which a workstation to which employees log on is located, the workstation comprising a monitor, and the act (C) comprises electronically sending a message for display on the monitor to notify the employee that he/she is to return to the station and automatically logging the employee off the workstation.

14. The method of claim 13, wherein the at least one employee location data source comprises a radio frequency identification (RFID) reader configured to receive signal from an RFID tag transported by the employee.

15. The method of claim 14, wherein the RFID reader is deployed at or near the station to which the employee is assigned during the particular time period.

16. The method of claim 13, wherein the at least one employee location data source comprises at least one location-aware device of a location-based service configured for geofencing.

17. The method of claim 13, wherein the at least one employee location data source comprises at least one workstation to which employees log on to perform work.

18. The method of claim 13, wherein the video depicting the restaurant during the particular time period depicts the employee.

19. The method of claim 13, wherein the video depicting the restaurant during the particular time period depicts one or more cashier stations at which customers queue.

20. The method of claim 13, wherein the video depicting the restaurant during the particular time period depicts a food preparation area in which multiple employees prepare food.

21. The method of claim 13, wherein the at least one processor is programmed to determine whether the employee improperly vacated the station based at least in part on data collected by at least one operational data system at or near the station.

22. The method of claim 21, wherein the at least one operational data system comprises a cashier workstation configured to receive input describing customer orders.

23. The method of claim 13, wherein causing the employee to be redirected back to the station comprises ceasing sending work to the other location.

24. The method of claim 13, wherein causing the employee to be redirected to the station comprises electronically notifying the employee's manager that the employee has improperly vacated the station.

25. At least one non-transitory computer-readable storage medium having instructions encoded thereon which, when executed by at least one computing device in a system comprising at least one employee location data source and at least one recording device configured to capture video recordings of occurrences in a restaurant, causes the at least one computing device to perform a method comprising acts of:

(A) determining, based at least in part on data from the at least one employee location data source, that an employee vacated a station in the restaurant to which the employee is assigned during a particular time period;

(B) determining whether the employee improperly vacated the station based at least in part on an analysis of a video recording captured by the at least one recording device, the analysis relating to identifying whether one or more predefined conditions existed in the restaurant at a time when the employee vacated the station;

(C) if it is determined that the employee improperly vacated the station, causing the employee to be redirected back to the station;

wherein the act (B) comprises determining that the employee left the station for another location at which a workstation to which employees log on is located, the workstation comprising a monitor, and the act (C) comprises electronically sending a message for display on the monitor to notify the employee that he/she is to return to the station and automatically logging the employee off the workstation.

* * * * *